(12) United States Patent
Shimodaira

(10) Patent No.: US 8,150,189 B2
(45) Date of Patent: Apr. 3, 2012

(54) IMAGE GENERATING APPARATUS AND METHOD

(75) Inventor: Masato Shimodaira, Osaka (JP)

(73) Assignee: Keyence Corporation, Osaka (JP)

( * ) Notice: Subject to any disclaimer, the term of this patent is extended or adjusted under 35 U.S.C. 154(b) by 752 days.

(21) Appl. No.: 12/352,691

(22) Filed: Jan. 13, 2009

(65) Prior Publication Data

US 2009/0208129 A1 Aug. 20, 2009

(30) Foreign Application Priority Data

Feb. 19, 2008 (JP) ................................. 2008-036795

(51) Int. Cl.
*G06K 9/40* (2006.01)

(52) U.S. Cl. ......... 382/254; 382/261; 382/264; 382/275

(58) Field of Classification Search ........................ None
See application file for complete search history.

(56) References Cited

U.S. PATENT DOCUMENTS

| | | | | |
|---|---|---|---|---|
| 2005/0244053 A1* | 11/2005 | Hayaishi | ........................ | 382/164 |
| 2006/0039590 A1* | 2/2006 | Lachine et al. | ................ | 382/128 |
| 2006/0045384 A1* | 3/2006 | De Haan | ........................ | 382/299 |
| 2008/0122953 A1* | 5/2008 | Wakahara et al. | ............ | 348/241 |

FOREIGN PATENT DOCUMENTS

JP 2006-014024 1/2006

OTHER PUBLICATIONS

Takagi et al., "Handbook of Image Analysis," Tokyo University Press, 1991, pp. 539-543.
Nagao et al., "Edge Preserving Smoothing," Computer Graphics and Image Processing, vol. 9, No. 4, 1979, pp. 394-407.

* cited by examiner

*Primary Examiner* — Jason M Repko
*Assistant Examiner* — Siamak Harandi
(74) *Attorney, Agent, or Firm* — Kilyk & Bowersox, P.L.L.C.

(57) ABSTRACT

There are provided an image generating apparatus and an image generating method, which are capable of generating an image with only a noise portion reliably deleted. A reduced image is generated by reducing the multi-valued image, smoothing processing is executed on the reduced image, an edge image is generated from the reduced image, edge angle information concerning edge angles is generated in pixel units from the edge image, a synthesizing rate of the multi-valued image and the smoothed reduced image is calculated in pixel units of the reduced image based upon the edge angle information. An enlarged image is generated by enlarging the smoothed reduced image to an identical scale, the synthesizing rate calculated in pixel units of the reduced image is converted into a synthesizing rate in pixel units of the enlarged image, and the multi-valued image and the enlarged image are synthesized based upon the converted synthesizing rate.

24 Claims, 12 Drawing Sheets

F I G. 7A
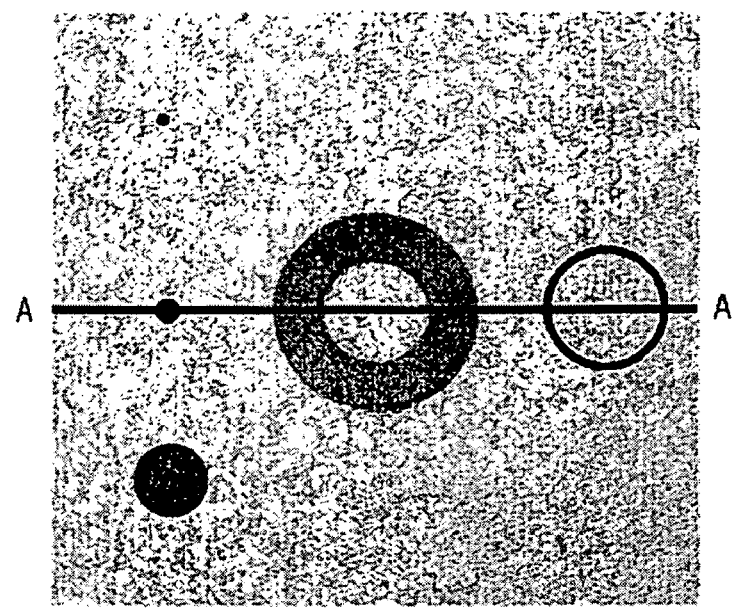
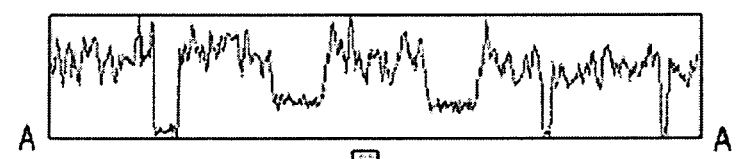
F I G. 7B
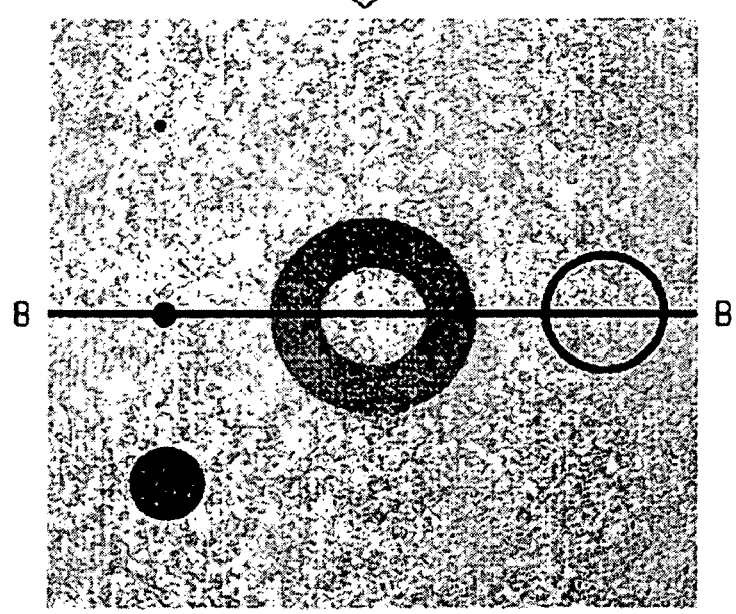
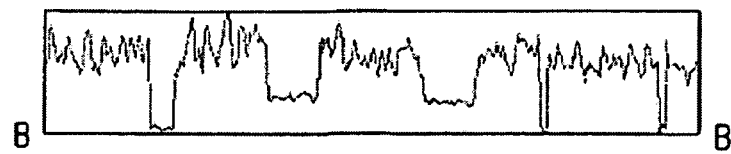

IMAGE GENERATING APPARATUS AND METHOD

CROSS-REFERENCE TO RELATED APPLICATIONS

The present application claims foreign priority based on Japanese Patent Application No. 2008-036795, filed Feb. 19, 2008, the contents of which is incorporated herein by reference.

BACKGROUND OF THE INVENTION

1. Field of the Invention

The present invention relates to an image generating apparatus and an image generating method, which are capable of removing an unnecessary noise portion from a multi-valued image to generate an image with a necessary edge portion left therein.

2. Description of the Related Art

Conventionally, when an image includes a noise portion other than an edge portion, in a case of extracting edge information from this image to perform image processing, the influence of the noise portion is inevitable. In the case of executing image matching processing through use of edge information on an image including a noise portion to a large degree, for example, there has been problems in that the matching processing requires a long time, the matching accuracy is not improved, and the like.

In order to solve such problems, smoothing processing is often performed using, for example, an averaging filter, a Gaussian filter or the like so as to delete the noise portion (cf. "Handbook of Image Analysis", by Mikio Takagi and Hirohisa Shimoda, Tokyo University Press, 1991, p. 539-543). However, performing the smoothing processing can delete the noise portion, but makes the edge portion further blurred.

Therefore, "Handbook of Image Analysis" discloses a use of a median filter which replaces a luminance value by a center value of a periphery. With the use of the median filter, it is possible to effectively remove dotted noise without losing the clearness of the edge portion.

Further, as disclosed in "Edge Preserving Smoothing", (by Makoto Nagao and Takashi Matsuyama, "Computer Graphics and Image Processing", Vol. 9, No. 4, 1979, p. 394-407), in a case of dividing an image with square regions, replacing a luminance value by a mean value of luminance values of a region with the smallest dispersion thereof among eight regions in the periphery of a prescribed region can perform the smoothing processing without losing the clearness of the edge portion.

Moreover, Japanese Unexamined Patent Publication No 2006-014024 discloses a noise removing method in which the smoothing processing is executed using only a pixel in which a difference in luminance value is within a prescribed threshold. Also in Japanese Unexamined Patent Publication No 2006-014024, it is possible to perform the smoothing processing without losing the clearness of the edge portion.

SUMMARY OF THE INVENTION

However, in a case of using the median filter disclosed in "Handbook of Image Analysis", when a large-sized noise portion is intended to be removed, the noise portion can be reliably removed, but there has been a problem in that a segment smaller than the noise portion or the like is removed along with the noise portion, resulting in removal of portions including a necessary portion in an original image.

Further, in a method disclosed in "Edge Preserving Smoothing", clearness of an edge portion is not lost, but there has been a problem in that a noise portion not smaller than a certain size cannot be deleted since the processing is performed in a local range.

Moreover, also in the method disclosed in Japanese Unexamined Patent Publication No. 2006-014024, the clearness of the edge portion is not lost, but there has been a problem in that, when a difference in luminance value of the noise portion is not vastly different from a difference in luminance value of the edge portion, an appropriate threshold cannot be set, and hence the noise portion might not be reliably deleted.

The present invention was made in view of the above circumstances, and has an object to provide an image generating apparatus, an image generating method and a computer program, which are capable of generating an image with only a noise portion reliably deleted, without losing the clearness of the edge portion.

In order to achieve the above object, an image generating apparatus according to a first aspect of the present invention is an image generating apparatus for generating a smoothing-processed image from a multi-valued image picked up by an image pickup device, the apparatus including: an image reducing device for generating a reduced image by reducing the multi-valued image picked up by the image pickup device; a smoothing device for executing smoothing processing on the reduced image; an edge image generating device for generating an edge image based upon the reduced image; an edge angle information generating device for generating edge angle information concerning edge angles in pixel units from the generated edge image; a rate calculating device for calculating a synthesizing rate of the multi-valued image and the smoothed reduced image in pixel units of the reduced image based upon the generated edge angle information; an image enlarging device for generating an enlarged image by enlarging the smoothed reduced image to an identical scale as the multi-valued image; a rate converting device for converting the synthesizing rate calculated in pixel units of the reduced image into a synthesizing rate in pixel units of the enlarged image; and an image synthesizing device for synthesizing the multi-valued image and the enlarged image based upon the converted synthesizing rate.

Further, an image generating apparatus according to a second aspect of the present invention, in accordance with the first aspect of the present invention, the rate calculating device is configured to calculate a degree of variation in edge angle based upon the generated edge angle information, and calculate a synthesizing rate of the multi-valued image and the smoothed reduced image in pixel units of the reduced image based upon the calculated degree of variation in edge angle.

Further, an image generating apparatus according to a third aspect of the present invention, in accordance with the second aspect of the present invention, an edge strength information generating device is included which generates edge strength information concerning edge strengths in pixel units from the generated edge image, and the edge angle information generating device is configured to calculate a degree of variation in edge angle in pixel units based upon the generated edge strength information, to generate the edge angle information.

Next, in order to solve the above-mentioned problems, an image generating apparatus according to a fourth aspect of the present invention is an image generating apparatus for generating a smoothing-processed image from a multi-valued image picked up by an image pickup device, the apparatus including: an image reducing device for generating a reduced image by reducing the multi-valued image picked up by the image pickup device; a smoothing device for executing smoothing processing on the reduced image; an edge image generating device for generating an edge image based upon the reduced image; an edge strength information generating device for generating edge strength information concerning edge strengths in pixel units from the generated edge image; a rate calculating device for calculating a synthesizing rate of the multi-valued image and the smoothed reduced image in pixel units of the reduced image based upon the generated edge strength information; an image enlarging device for generating an enlarged image by enlarging the smoothed reduced image to an identical scale as the multi-valued image; a rate converting device for converting the synthesizing rate calculated in pixel units of the reduced image into a synthesizing rate in pixel units of the enlarged image; and an image synthesizing device for synthesizing the multi-valued image and the enlarged image based upon the converted synthesizing rate.

Further, an image generating apparatus according to a fifth aspect of the present invention, in accordance with the fourth aspect of the present invention, the edge strength information generating device is configured to generate edge strength information in accordance with a degree of fluctuation in luminance value in the edge image.

Next, in order to solve the above-mentioned problems, an image generating apparatus according to a sixth aspect of the present invention is an image generating apparatus for generating a smoothing-processed image from a multi-valued image picked up by an image pickup device, the apparatus including: an image reducing device for generating a reduced image by reducing the multi-valued image picked up by the image pickup device; a smoothing device for executing smoothing processing on the reduced image; a dispersion calculating device for calculating dispersion of luminance values in a region formed of a prescribed pixel and pixels adjacent to the pixel; a rate calculating device for calculating a synthesizing rate of the multi-valued image and the smoothed reduced image in pixel units of the reduced image based upon the calculated dispersion; an image enlarging device for generating an enlarged image by enlarging the smoothed reduced image to an identical scale as the multi-valued image; a rate converting device for converting the synthesizing rate calculated in pixel units of the reduced image into a synthesizing rate in pixel units of the enlarged image; and an image synthesizing device for synthesizing the multi-valued image and the enlarged image based upon the converted synthesizing rate.

Further, an image generating apparatus according to a seventh aspect of the present invention, in accordance with the first aspect of the present invention, the smoothing device is configured to also execute the smoothing processing on the multi-valued image, the rate calculating device is configured to also calculate a synthesizing rate of the multi-valued image and the smoothed multi-valued image, and the image synthesizing device is configured to synthesize the multi-valued image and the smoothed multi-valued image, and thereafter additionally synthesize the enlarged image based upon the synthesizing rate of the converted multi-valued image and the smoothed reduced image.

Further, an image generating apparatus according to an eighth aspect of the present invention, in accordance with the first aspect of the present invention, a reduction ratio selection accepting device is included which accepts a selection of a reduction ratio in the image reducing device, and the image reducing device is configured to hierarchically generate reduced images in an increasing order of reduction ratios in accordance with sizes of the reduction ratios, the selection of which have been accepted.

Further, an image generating apparatus according to a ninth aspect of the present invention, in accordance with the eighth aspect of the present invention, the rate calculating device is configured to calculate synthesizing rates of the multi-valued image and a plurality of the smoothed reduced images in pixel units of the respective reduced images, and the rate converting device is configured to convert the plurality of synthesizing rates calculated in pixel units of the respective reduced images into a synthesizing rate in pixel units of the enlarged image.

Further, an image generating apparatus according to a tenth aspect of the present invention, in accordance with the eighth aspect of the present invention, the rate calculating device is configured to sequentially calculate, in the increasing order of reduction ratios, each of synthesizing rates of a reduced image with a next large reduction ratio and a synthesized image based upon the reduced image, synthesized by the image synthesizing device on the identical scale as the multi-valued image, the rate converting device is configured to sequentially convert synthesizing rates calculated in pixel units of the respective reduced images into synthesizing rates in pixel units of the identical scale as the multi-valued image, and the image synthesizing device synthesizes the smoothed reduced image and the synthesized images based upon the calculated synthesizing rates in pixel units, sequentially from the reduced image with the smallest reduction ratio.

Next, in order to solve the above-mentioned problems, an image generating apparatus according to an eleventh aspect of the present invention is an image generating apparatus for generating a smoothing-processed image from a multi-valued image picked up by an image pickup device, the apparatus including: an image reducing device for generating a reduced image by reducing the multi-valued image picked up by the image pickup device; a smoothing device for executing smoothing processing on the reduced image; a rate calculating device for calculating a synthesizing rate of the multi-valued image and the smoothed reduced image in pixel units of the reduced image based upon luminance information of the reduced image; an image enlarging device for generating an enlarged image by enlarging the smoothed reduced image to an identical scale as the multi-valued image; a rate converting device for converting the synthesizing rate calculated in pixel units of the reduced image into a synthesizing rate in pixel units of the enlarged image; and an image synthesizing device for synthesizing the multi-valued image and the enlarged image based upon the converted synthesizing rate.

Next, in order to solve the above-mentioned problems, an image generating method according to a twelfth aspect of the present invention is an image generating method executed in an image generating apparatus for generating a smoothing-processed image from a multi-valued image picked up by an image pickup device, wherein a reduced image is generated by reducing the multi-valued image picked up by the image pickup device, smoothing processing is executed on the reduced image, an edge image is generated based upon the reduced image, edge angle information concerning edge angles is generated in pixel units from the generated edge image, a synthesizing rate of the multi-valued image and the smoothed reduced image is calculated in pixel units of the reduced image based upon the generated edge angle information, an enlarged image is generated by enlarging the smoothed reduced image to an identical scale as the multi-valued image, the synthesizing rate calculated in pixel units of the reduced image is converted into a synthesizing rate in pixel units of the enlarged image, and the multi-valued image and the enlarged image are synthesized based upon the converted synthesizing rate.

Further, an image generating method according to a thirteenth aspect of the present invention, in accordance with the twelfth aspect of the present invention, a degree of variation in edge angle is calculated based upon the generated edge angle information, and a synthesizing rate of the multi-valued image and the smoothed reduced image is calculated in pixel units of the reduced image based upon the calculated degree of variation in edge angle.

Further, an image generating method according to a fourteenth aspect of the present invention, in accordance with the thirteenth aspect of the present invention, edge strength information concerning edge strengths is generated in pixel units from the generated edge image, and a degree of variation in edge angle is calculated in pixel units based upon the generated edge strength information, to generate the edge angle information.

Next, in order to solve the above-mentioned problems, an image generating method according to a fifteenth aspect of the present invention is an image generating method executed in an image generating apparatus for generating a smoothing-processed image from a multi-valued image picked up by an image pickup device, wherein a reduced image is generated by reducing the multi-valued image picked up by the image pickup device, smoothing processing is executed on the reduced image, an edge image is generated based upon the reduced image, edge strength information concerning edge strengths is generated in pixel units from the generated edge image, a synthesizing rate of the multi-valued image and the smoothed reduced image is calculated in pixel units of the reduced image based upon the generated edge strength information, an enlarged image is generated by enlarging the smoothed reduced image to an identical scale as the multi-valued image, the synthesizing rate calculated in pixel units of the reduced image is converted into a synthesizing rate in pixel units of the enlarged image, and the multi-valued image and the enlarged image are synthesized based upon the converted synthesizing rate.

Further, an image generating method according to a sixteenth aspect of the present invention, in accordance with the fifteenth aspect of the present invention, edge strength information is generated in accordance with a degree of fluctuation in luminance value in the edge image.

Next, in order to solve the above-mentioned problems, an image generating method according to a seventeenth aspect of the present invention is an image generating method executed in an image generating apparatus for generating a smoothing-processed image from a multi-valued image picked up by an image pickup device, wherein a reduced image is generated by reducing the multi-valued image picked up by the image pickup device, smoothing processing is executed on the reduced image, dispersion of luminance values in a region formed of a prescribed pixel and pixels adjacent to the pixel is calculated, a synthesizing rate of the multi-valued image and the smoothed reduced image is calculated in pixel units of the reduced image based upon the calculated dispersion, an enlarged image is generated by enlarging the smoothed reduced image to an identical scale as the multi-valued image, the synthesizing rate calculated in pixel units of the reduced image is converted into a synthesizing rate in pixel units of the enlarged image, and the multi-valued image and the enlarged image are synthesized based upon the converted synthesizing rate.

Further, an image generating method according to an eighteenth aspect of the present invention, in accordance with the twelfth aspect of the present invention, the smoothing processing is also executed on the multi-valued image, a synthesizing rate of the multi-valued image and the smoothed multi-valued image is calculated in pixel units, and after the multi-valued image and the smoothed multi-valued image are synthesized, the enlarged image is also synthesized based upon the synthesizing rate of the converted multi-valued image and the smoothed reduced image.

Further, an image generating method according to a nineteenth aspect of the present invention, in accordance with the twelfth aspect of the present invention, a selection of a reduction ratio is accepted, and reduced images are hierarchically generated in the increasing order of reduction ratios in accordance with sizes of the reduction ratios, the selection of which have been accepted.

Further, an image generating method according to a twentieth aspect of the present invention, in accordance with the nineteenth aspect of the present invention, synthesizing rates of the multi-valued image and a plurality of the smoothed reduced images are calculated in pixel units of the respective reduced images, and a plurality of the synthesizing rates calculated in pixel units of the respective reduced images are converted into a synthesizing rate in pixel units of the enlarged image.

Further, an image generating method according to a twenty-first aspect of the present invention, in accordance with the nineteenth aspect of the present invention in the increasing order of reduction ratios, each of synthesizing rates of a reduced image with a next large reduction ratio and a synthesized image based upon the reduced image, synthesized on the identical scale as the multi-valued image, is sequentially calculated, synthesizing rates calculated in pixel units of the respective reduced images are sequentially converted into synthesizing rates in pixel units of the identical scale as the multi-valued image, and the smoothed reduced image and the synthesized images are synthesized based upon the calculated synthesizing rates in pixel units, sequentially from the reduced image with the smallest reduction ratio.

Next, in order to solve the above-mentioned problems, an image generating method according to a twenty-second aspect of the present invention is an image generating method executed in an image generating apparatus for generating a smoothing-processed image from a multi-valued image picked up by an image pickup device, wherein a reduced image is generated by reducing the multi-valued image picked up by the image pickup device, smoothing processing is executed on the reduced image, a synthesizing rate of the multi-valued image and the smoothed reduced image is calculated in pixel units of the reduced image based upon luminance information of the reduced image, an enlarged image is generated by enlarging the smoothed reduced image to an identical scale as the multi-valued image, the synthesizing rate calculated in pixel units of the reduced image is converted into a synthesizing rate in pixel units of the enlarged image, and the multi-valued image and the enlarged image are synthesized based upon the converted synthesizing rate.

Next, in order to solve the above-mentioned problems, an image generating apparatus according to a twenty-third aspect of the present invention is an image generating apparatus for generating a smoothing-processed image from a multi-valued image picked up by an image pickup device, the apparatus including: an image reducing device for generating a reduced image by reducing the multi-valued image picked up by the image pickup device; a smoothing device for executing smoothing processing on the reduced image; a rate calculating device for calculating a synthesizing rate of the multi-valued image and the smoothed reduced image in pixel units of the reduced image based upon a prescribed characteristic amount in the reduced image; an image enlarging device for generating an enlarged image by enlarging the smoothed reduced image to an identical scale as the multi-valued image; a rate converting device for converting the synthesizing rate calculated in pixel units of the reduced image into a synthesizing rate in pixel units of the enlarged image; and an image synthesizing device for synthesizing the multi-valued image and the enlarged image based upon the converted synthesizing rate.

Next, in order to solve the above-mentioned problems, an image generating method according to a twenty-fourth aspect of the present invention is an image generating method executed in an image generating apparatus for generating a smoothing-processed image from a multi-valued image picked up by an image pickup device, wherein a reduced image is generated by reducing the multi-valued image picked up by the image pickup device, smoothing processing is executed on the reduced image, a synthesizing rate of the multi-valued image and the smoothed reduced image is calculated in pixel units of the reduced image based upon a prescribed characteristic amount in the reduced image, an enlarged image is generated by enlarging the smoothed reduced image to an identical scale as the multi-valued image, the synthesizing rate calculated in pixel units of the reduced image is converted into a synthesizing rate in pixel units of the enlarged image, and the multi-valued image and the enlarged image are synthesized based upon the converted synthesizing rate.

Next, in order to solve the above-mentioned problems, a computer program according to a twenty-fourth aspect of the present invention is a computer program executed in an image generating apparatus for generating a smoothing-processed image from a multi-valued image picked up by an image pickup device, wherein the image generating apparatus is made to function as: an image reducing device for generating a reduced image by reducing the multi-valued image picked up by the image pickup device; a smoothing device for executing smoothing processing on the reduced image; an edge image generating device for generating an edge image based upon the reduced image; an edge angle information generating device for generating edge angle information concerning edge angles in pixel units from the generated edge image; a rate calculating device for calculating a synthesizing rate of the multi-valued image and the smoothed reduced image in pixel units of the reduced image based upon the generated edge angle information; an image enlarging device for generating an enlarged image by enlarging the smoothed reduced image to an identical scale as the multi-valued image; a rate converting device for converting the synthesizing rate calculated in pixel units of the reduced image into a synthesizing rate in pixel units of the enlarged image; and an image synthesizing device for synthesizing the multi-valued image and the enlarged image based upon the converted synthesizing rate.

Next, in order to solve the above-mentioned problems, a computer program according to a twenty-sixth aspect of the present invention is a computer program executed in an image generating apparatus for generating a smoothing-processed image from a multi-valued image picked up by an image pickup device, wherein the image generating apparatus is made to function as: an image reducing device for generating a reduced image by reducing the multi-valued image picked up by the image pickup device; a smoothing device for executing smoothing processing on the reduced image; an edge image generating device for generating an edge image based upon the reduced image; an edge strength information generating device for generating edge strength information concerning edge strengths in pixel units from the generated edge image; a rate calculating device for calculating a synthesizing rate of the multi-valued image and the smoothed reduced image in pixel units of the reduced image based upon the generated edge strength information; an image enlarging device for generating an enlarged image by enlarging the smoothed reduced image to an identical scale as the multi-valued image; a rate converting device for converting the synthesizing rate calculated in pixel units of the reduced image into a synthesizing rate in pixel units of the enlarged image; and an image synthesizing device for synthesizing the multi-valued image and the enlarged image based upon the converted synthesizing rate.

Next, in order to solve the above-mentioned problems, an image generating apparatus according to a twenty-seventh aspect of the present invention is an image generating apparatus for generating a smoothing-processed image from a multi-valued image picked up by an image pickup device, the apparatus including: an image reducing device for generating a reduced image by reducing the multi-valued image picked up by the image pickup device; a smoothing device for executing smoothing processing on the reduced image; a dispersion calculating device for calculating dispersion of luminance values in a region formed of a prescribed pixel and pixels adjacent to the pixel; a rate calculating device for calculating a synthesizing rate of the multi-valued image and the smoothed reduced image in pixel units of the reduced image based upon the calculated dispersion; an image enlarging device for generating an enlarged image by enlarging the smoothed reduced image to an identical scale as the multi-valued image; a rate converting device for converting the synthesizing rate calculated in pixel units of the reduced image into a synthesizing rate in pixel units of the enlarged image; and an image synthesizing device for synthesizing the multi-valued image and the enlarged image based upon the converted synthesizing rate.

Next, in order to solve the above-mentioned problems, a computer program according to a twenty-eighth aspect of the present invention is a computer program executed in an image generating apparatus for generating a smoothing-processed image from a multi-valued image picked up by an image pickup device, wherein the image generating apparatus is made to function as: an image reducing device for generating a reduced image by reducing the multi-valued image picked up by the image pickup device; a smoothing device for executing smoothing processing on the reduced image; a rate calculating device for calculating a synthesizing rate of the multi-valued image and the smoothed reduced image in pixel units of the reduced image based upon luminance information of the reduced image; an image enlarging device for generating an enlarged image by enlarging the smoothed reduced image to an identical scale as the multi-valued image; a rate converting device for converting the synthesizing rate calculated in pixel units of the reduced image into a synthesizing rate in pixel units of the enlarged image; and an image synthesizing device for synthesizing the multi-valued image and the enlarged image based upon the converted synthesizing rate.

Next, in order to solve the above-mentioned problems, a computer program according to a twenty-ninth aspect of the present invention is a computer program executed in an image generating apparatus for generating a smoothing-processed image from a multi-valued image picked up by an image pickup device, wherein the image generating apparatus is made to function as: an image reducing device for generating a reduced image by reducing the multi-valued image picked up by the image pickup device; a smoothing device for executing smoothing processing on the reduced image; a rate calculating device for calculating a synthesizing rate of the multi-valued image and the smoothed reduced image in pixel units of the reduced image based upon a prescribed characteristic amount in the reduced image; an image enlarging device for generating an enlarged image by enlarging the smoothed reduced image to an identical scale as the multi-valued image; a rate converting device for converting the synthesizing rate calculated in pixel units of the reduced image into a synthesizing rate in pixel units of the enlarged image; and an image synthesizing device for synthesizing the multi-valued image and the enlarged image based upon the converted synthesizing rate.

In the first and twelfth aspects of the present invention, a reduced image is generated by reducing the multi-valued image picked up by the image pickup device, smoothing processing is executed on the reduced image, and an edge image is generated based upon the reduced image. Edge angle information concerning edge angles is generated in pixel units from the generated edge image, and based upon the generated edge angle information, a synthesizing rate of the multi-valued image and the smoothed reduced image is calculated in pixel units of the reduced image. An enlarged image is generated by enlarging the smoothed reduced image to an identical scale as the multi-valued image, the synthesizing rate calculated in pixel units of the reduced image is converted into a synthesizing rate in pixel units of the enlarged image, and based upon the converted synthesizing rate, the multi-valued image and the enlarged image are synthesized. Performing the smoothing processing on the reduced image makes a local noise portion difficult to pickup, thereby enabling distinction between a portion likely to be the edge portion and a portion less likely to be the edge portion in accordance with the edge angle information. Therefore, the synthesizing rate is calculated such that a portion less likely to be the edge portion has a higher synthesizing rate of the smoothed image, whereby the noise portion can be reliably deleted while the edge portion is clearly held.

In the second and thirteenth aspects of the present invention, a degree of variation in edge angle is calculated based upon the generated edge angle information. Based upon the calculated degree of variation in edge angle, a synthesizing rate of the multi-valued image and the smoothed reduced image is calculated in pixel units of the reduced image. Even in a case of deleting a large noise portion, calculating the synthesizing rate of the multi-valued image and the smoothed reduced image based upon the degree of variation in edge angle can avoid simultaneous deletion of for example, a segment a portion that is not the noise portion and is thinner than the noise portion. Further, even in a case where a difference in luminance value of the noise portion is not vastly different from a difference in luminance value of the edge portion, the noise portion can be reliably detected and deleted in accordance with the degree of variation in edge angle.

In the third and fourteenth aspects of the present invention, edge strength information concerning edge strengths is generated in pixel units from the generated edge image, and a degree of variation in edge angle is calculated in pixel units based upon the generated edge strength information. Calculating the degree of variation in edge angle by normalization with use of edge strength information can calculate a pure degree of variation in edge angle which is not affected by the edge strength.

In the fourth and fifteenth aspects of the present invention, a reduced image is generated by reducing the multi-valued image picked up by the image pickup device, smoothing processing is executed on the reduced image, and an edge image is generated based upon the reduced image. Edge strength information concerning edge strengths is generated in pixel units from the generated edge image, and based upon the generated edge strength information, a synthesizing rate of the multi-valued image and the smoothed reduced image is calculated in pixel units of the reduced image. An enlarged image is generated by enlarging the smoothed reduced image to an identical scale as the multi-valued image, the synthesizing rate calculated in pixel units of the reduced image is converted into a synthesizing rate in pixel units of the enlarged image, and based upon the converted synthesizing rate, the multi-valued image and the enlarged image are synthesized. Performing the smoothing processing on the reduced image makes a local noise portion difficult to pickup, thereby enabling distinction between a portion likely to be the edge portion and a portion less likely to be the edge portion in accordance with the edge strength information. Therefore, the synthesizing rate is calculated such that a portion less likely to be the edge portion has a higher synthesizing rate of the smoothed image, whereby the noise portion can be reliably deleted while the edge portion is clearly held.

In the fifth and sixteenth aspects of the present invention, edge strength information is generated in accordance with a degree of fluctuation in luminance value in the edge image. Calculating a larger (smaller) edge strength for a portion with a larger (smaller) degree of fluctuation in luminance value can lead to determination that a portion with a larger edge strength is less likely to be the noise portion so that the clearness of the edge portion can be reliably held.

In the sixth and the seventeenth aspects of the present invention, a reduced image is generated by reducing the multi-valued image picked up by the image pickup device, smoothing processing is executed on the reduced image, dispersion of luminance values in a region formed of a prescribed pixel and pixels adjacent to the pixel is calculated, and based upon the calculated dispersion, a synthesizing rate of the multi-valued image and the smoothed reduced image is calculated in pixel units of the reduced image. An enlarged image is generated by enlarging the smoothed reduced image to an identical scale as the multi-valued image, the synthesizing rate calculated in pixel units of the reduced image is converted into a synthesizing rate in pixel units of the enlarged image, and based upon the converted synthesizing rate, the multi-valued image and the enlarged image are synthesized. Performing the smoothing processing on the reduced image makes a local noise portion difficult to pickup, thereby enabling distinction between a portion likely to be the edge portion and a portion less likely to be the edge portion in accordance with dispersion of the luminance values. Therefore, the synthesizing rate is calculated such that a portion with higher dispersion of the luminance values, namely a portion more likely to be the noise portion, has a higher synthesizing rate of the smoothed image, whereby the noise portion can be reliably deleted while the edge portion is clearly held.

In the seventh and eighteenth aspects of the present invention, the smoothing processing is also executed on the multi-valued image, a synthesizing rate of the multi-valued image and the smoothed multi-valued image is calculated, and after the multi-valued image and the smoothed multi-valued image are synthesized, the enlarged image is also synthesized based upon the synthesizing rate of the converted multi-valued image and the smoothed reduced image. Performing pre-processing to make a portion likely to be the edge portion clearer and deleting a portion less likely to be the edge portion on the original multi-valued image can process clearer distinction between the edge portion and the non-edge portion.

In the eighth and nineteenth aspects of the present invention, a selection of a reduction ratio is accepted, and reduced images are hierarchically generated in the increasing order of reduction ratios in accordance with sizes of the reduction ratios, the selection of which have been accepted. Hence the noise portion can be deleted more reliably without depending upon the size of the noise portion.

In the ninth and twentieth aspects of the present invention, synthesizing rates of the multi-valued image and a plurality of the smoothed reduced images are calculated in pixel units of the respective reduced images, and a plurality of the synthesizing rates calculated in pixel units of the respective reduced images are converted into a synthesizing rate in pixel units of the enlarged image. Integrating all synthesizing rates calculated with reduced images on the basis of the enlarged images can reflect the effect of the noise portion deleting processing at all reduction ratios to the synthesized image by executing the image synthesizing processing only once.

In the tenth and twenty-first aspects of the present invention, in the increasing order of reduction ratios, each of synthesizing rates of a reduced image with a next large reduction ratio and a synthesized image based upon the reduced image, synthesized on the identical scale as the multi-valued image, is sequentially calculated. Synthesizing rates calculated in pixel units of the respective reduced images are sequentially converted into synthesizing rates in pixel units of the identical scale as the multi-valued image, and the smoothed reduced image and the synthesized images are synthesized based upon the calculated synthesizing rates in pixel units, sequentially from the reduced image with the smallest reduction ratio. Sequentially from a reduced image with the smallest reduction ratio, e.g. the original multi-valued image, each of synthesizing rates of reduced images having been smoothed, which have the identical scale as that of the original multi-valued image and a next large reduction ratio, and the synthesized image having been synthesized is calculated to synthesize an image, and subsequently, synthesizing rates are sequentially calculated to repeatedly synthesize an image. Hence a portion determined to be the noise portion at any reduction ratio can be reliably deleted, whereby the noise portion can be deleted more reliably without depending upon the size of the noise portion.

In the eleventh and twenty-second aspects of the present invention, a reduced image is generated by reducing the multi-valued image picked up by the image pickup device, and smoothing processing is executed on the reduced image. Based upon luminance information of the reduced image, a synthesizing rate of the multi-valued image and the smoothed reduced image is calculated in pixel units of the reduced image. An enlarged image is generated by enlarging the smoothed reduced image to an identical scale as the multi-valued image, the synthesizing rate calculated in pixel units of the reduced image is converted into a synthesizing rate in pixel units of the enlarged image, and based upon the converted synthesizing rate, the multi-valued image and the enlarged image are synthesized. Performing the smoothing processing on the reduced image makes a local noise portion difficult to pickup, thereby enabling distinction between a portion likely to be the edge portion and a portion less likely to be the edge portion in accordance with luminance information of the reduced image. Therefore, the synthesizing rate is calculated such that a portion with a lager luminance value for example, namely a portion more likely to be the noise portion, has a higher synthesizing rate of the smoothed image, whereby the noise portion can be reliably deleted while the edge portion is clearly held.

In the twenty-third and twenty-fourth aspects of the present invention, a reduced image is generated by reducing the multi-valued image picked up by the image pickup device, and smoothing processing is executed on the reduced image. Based upon a prescribed characteristic amount in the reduced image, a synthesizing rate of the multi-valued image and the smoothed reduced image is calculated in pixel units of the reduced image, and an enlarged image is generated by enlarging the smoothed reduced image to an identical scale as the multi-valued image. The synthesizing rate calculated in pixel units of the reduced image is converted into a synthesizing rate in pixel units of the enlarged image, and based upon the converted synthesizing rate, the multi-valued image and the enlarged image are synthesized. Performing the smoothing processing on the reduced image makes a local noise portion difficult to pickup, thereby enabling distinction between a portion likely to be the edge portion and a portion less likely to be the edge portion in accordance with the characteristic amount in the reduced image. Therefore, the synthesizing rate is calculated such that a portion less likely to be the edge portion has a higher synthesizing rate of the smoothed image, whereby the noise portion can be reliably deleted while the edge portion is clearly held.

It is to be noted that in later-described embodiments, the image reducing device corresponds to processing performed by a main control section 21 in Step S202, Step S1202 and Step S1302, and the smoothing device corresponds to processing performed by the main control section 21 in Step S203, Step S602, Step S1203 and Step S1303. Further, the edge image generating device corresponds to processing performed by the main control section 21 in Step S204, Step S603 and Step S1204, the edge angle information generating device corresponds to processing performed by the main control section 21 in Step S205 and Step S604, the edge strength information generating device corresponds to processing performed by the main control section 21 in Step S1205, and the dispersion calculating device corresponds to processing performed by the main control section 21 in Step S1304.

Further, the rate calculating device corresponds to processing performed by the main control section 21 in Step S206, Step S605, Step S804, Step S1206 and Step S1305, the image enlarging device corresponds to processing performed by the main control section 21 in Step S207, Step S805, Step S1207 and Step S1306, the rate converting device corresponds to processing performed by the main control section 21 in Step S208, Step S806, Step S1208 and Step S1307, and the image synthesizing device corresponds to processing performed by the main control section 21 in Step S209, Step S606, Step S807, Step S1209 and Step S1308.

According to the present invention, performing the smoothing processing on the reduced image makes a local noise portion difficult to pickup, thereby enabling distinction between a portion likely to be the edge portion and a portion less likely to be the edge portion in accordance with a characteristic amount such as edge angle information, edge strength information, or luminance information. Therefore, the synthesizing rate is calculated such that a portion less likely to be the edge portion has a higher synthesizing rate of the smoothed image, whereby the noise portion can be reliably deleted while the edge portion is clearly held.

BRIEF DESCRIPTION OF THE DRAWINGS

FIGS. 7A and 7B are comparative views among an original multi-valued image, a smoothed multi-valued image, and a synthesized image in the image generating apparatus according to the first embodiment;

DETAILED DESCRIPTION OF THE PREFERRED EMBODIMENTS

Figure 1:
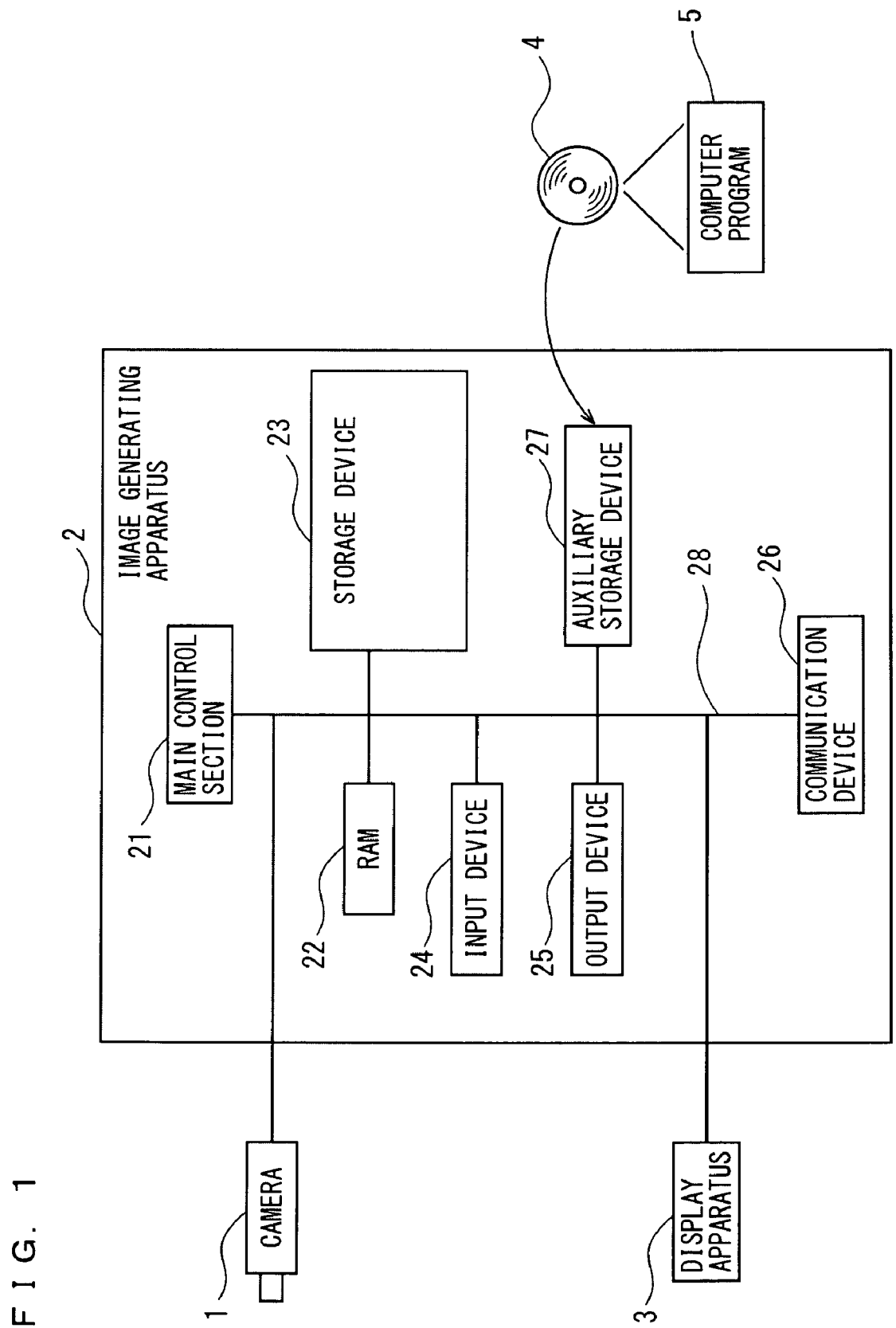
FIG. 1 is a block diagram schematically showing a configuration of an image generating apparatus according to a first embodiment of the present invention.

Hereinafter, an embodiment of the present invention is described with reference to drawings. It is to be noted that elements having the same or similar configurations or functions through the drawings referenced in description of each embodiment are provided with the same or similar reference numerals, and the detailed descriptions thereof are not given.

First Embodiment

FIG. 1 is a block diagram schematically showing a configuration of an image generating apparatus according to a first embodiment of the present invention. As shown in FIG. 1, an image generating apparatus 2 according to the first embodiment is connected with a camera 1 as an image pickup device for picking up a multi-valued image, and a display apparatus 3 which displays a picked-up multi-valued image or a generated image.

The image generating apparatus 2 is configured of at least a CPU (Central Processing Unit), a main control section 21 made up of an LSI or the like, an RAM 22, a storage device 23, an input device 24, an output device 25, a communication device 26, an auxiliary storage device 27, and an internal bus 28 for connecting the foregoing hardware. The main control section 21 is connected to each hardware section as described above of the image generating apparatus 2 through the internal bus 28, and controls the operation of each of the foregoing hardware sections while executing a variety of software functions in accordance with a computer program 5 stored in the storage device 23. The RAM 22 is a non-volatile memory, such as an SRAM or an SDRAM. This memory develops a load module at the time of execution of the computer program 5, and stores temporary data and the like generated at the time of execution of the computer program 5.

The storage device 23 is made up of a fixed-type storage apparatus (a hard disk, a volatile memory such as a flash memory), built therein, an ROM, and the like. The computer program 5 stored in the storage device 23 is downloaded by the auxiliary storage device 27 from a portable recording medium 4 such as a DVD, a CD-ROM or a flash memory where information of a program, data and the like are recorded. At the time of executing the computer program 5, it is developed from the storage device 23 to the RAM 22 and executed. Naturally, the computer program 5 may be a computer program downloaded from an external computer through the communication device 26.

The communication device 26 is connected to the internal bus 28, and is capable of transmitting and receiving data to and from the external computer or the like by being connected to an external network, such as the Internet, a LAN, a WAN or the like. Namely, the foregoing storage device 23 is not restricted to a configuration built in the image generating apparatus 2, but may be an external storage medium such as a hard disk, installed in an external server computer connected through the communication device 26.

The input device 24 is a broad concept including an overall apparatus that acquires input information of a touch panel integrated with a liquid crystal panel besides data input medium such as a keyboard and a mouse. The output device 25 means a printing apparatus such as a laser printer, a dot printer, and the like.

A camera 1 is a CCD camera having a CCD image pickup element, or the like. A display apparatus 3 is a display apparatus having a CRT, a liquid crystal panel, and the like. The camera 1, the display apparatus 3, and the like may be integrated with the image generating apparatus 2, or separated therefrom.

Figure 2:
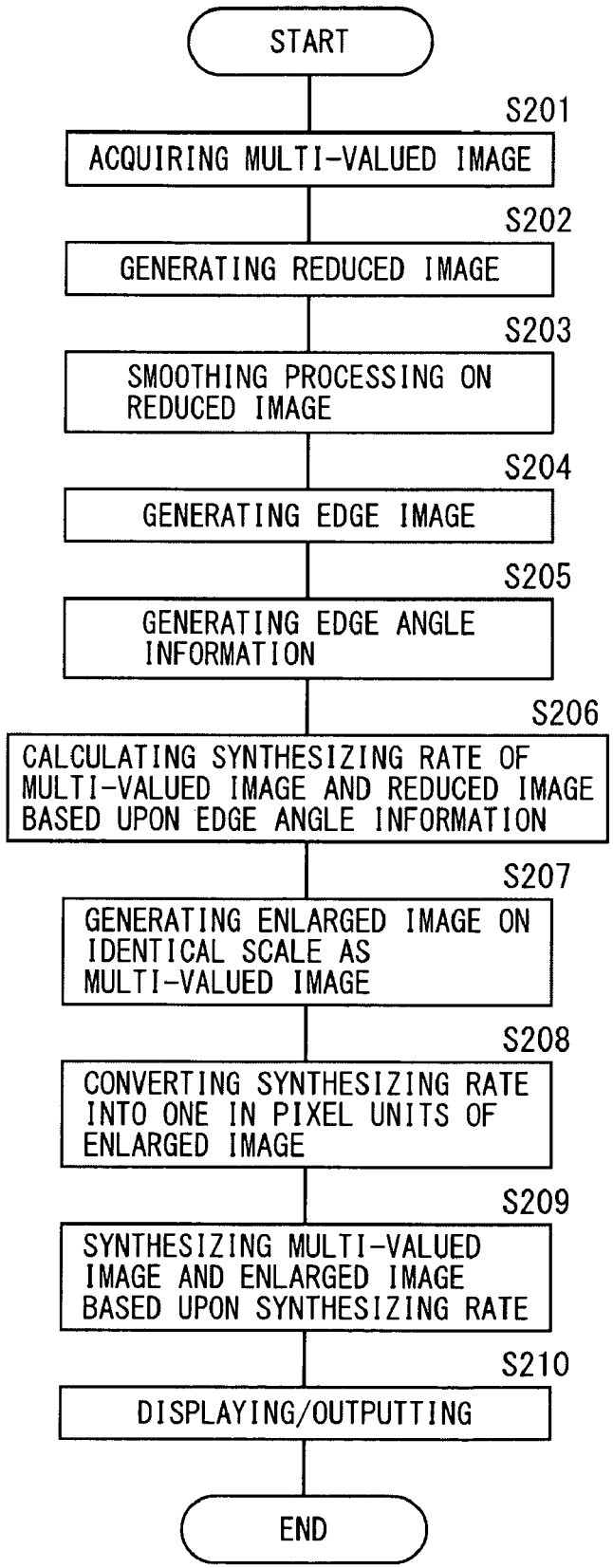
FIG. 2 is a flowchart showing a processing procedure for a main control section of the image generating apparatus according to the first embodiment of the present invention.

A flow of processing of the image generating apparatus 2 having the foregoing configuration is described. The image generating apparatus 2 according to the first embodiment calculates a synthesizing rate of an original multi-valued image and a smoothing-processed image in accordance with a prescribed characteristic amount in a reduced image having been reduced, to generate an image with a noise portion deleted. In the first embodiment, a case is described where a degree of variation in edge angle is taken as a characteristic amount as the basis of calculation of a synthesizing rate. FIG. 2 is a flowchart showing a procedure for processing of the main control section 21 of the image generating apparatus 2 according to the first embodiment of the present invention.

As shown in FIG. 2, the main control section 21 of the image generating apparatus 2 according to the first embodiment acquires a multi-valued image picked up by the camera 1 (Step S201), and generates a reduced image by reducing the acquired multi-valued image at a prescribed reduction ratio (Step S202). The main control section 21 executes smoothing processing on the reduced image having been reduced (Step S203). It is to be noted that the reduction ratio set in Step S202 is set after accepting selection by a user through a graphical user interface. For example, reduction ratios of 1/2, 1/4, 1/6, 1/8 and the like are prepared with respect to the original multi-valued image, and selection of the user is then accepted.

The content of the image reduction processing is not particularly restricted. For example, a known area averaging method may be used. Further, the content of the smoothing processing is not particularly restricted, either. For example, as in the conventional manner, an averaging filter, a Gaussian filter, or the like may be used, a median filter may be used, or the smoothing processing disclosed in "Edge Preserving Smoothing" described above may be executed.

Meanwhile, the main control section 21 generates an edge image based upon the reduced image (Step S204), and generates edge angle information concerning edge angles in pixel units from the generated edge image (Step S205).

Figure 3A:
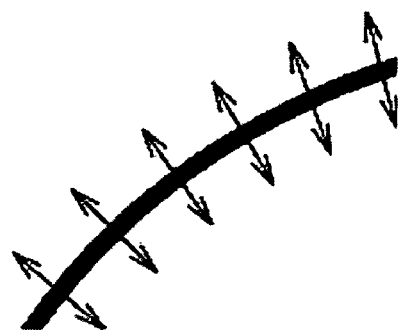
FIGS. 3A and 3B are schematic views for explaining an edge angle.
Figure 3B:
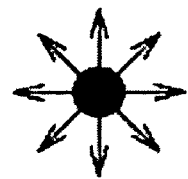

FIGS. 3A and 3B are schematic views for explaining the edge angle. As shown in FIG. 3A, since the edge angles can be obtained in directions of normal lines of the edge in the edge portion, a degree of change in edge substantially agrees with the degree of variation in edge angle. As opposed to this, as shown in FIG. 3B, since the edge angle is obtained in direction of normal lines of noise in the normal portion, the degree of variation in edge angle becomes far larger than that in FIG. 3A. Therefore, an object portion can be determined not as the noise portion when the degree of variation in edge angle within a prescribed region is converged within a prescribed range, and the object portion can be determined as the noise portion when the degree of variation in edge angle is large.

Returning to FIG. 2, the main control section 21 of the image generating apparatus 2 calculates a synthesizing rate of the multi-valued image and the smoothed reduced image in pixel units of the reduced image based upon the generated edge angle information (Step S206). Namely, in a pixel with a larger degree of variation in edge angle, an image is synthesized at a larger ratio of a smoothing-processed image, so that the noise portion can be deleted.

Figure 4:
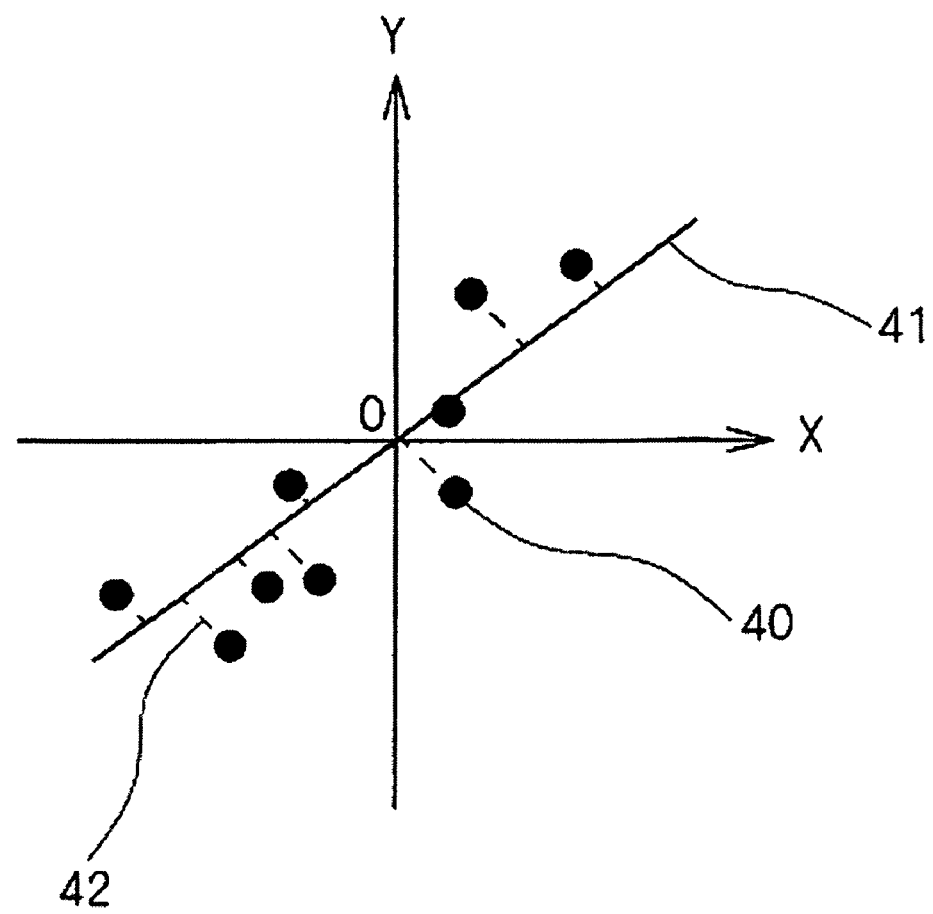
FIG. 4 is an exemplary view for explaining a method for calculating a degree of variation in edge angle.

The degree of variation in edge angle exemplified as the characteristic amount can be calculated, for example, by a method as follows. FIG. 4 is an exemplary view for explaining the method for calculating the degree of variation in edge angle. The example of FIG. 4 shows a method for obtaining a variation in edge angle within a 3×3 range.

For example, edge components 40, 40, . . . in an X-direction and a Y-direction are previously calculated with respect to respective pixels by use of a derivative filter such as a Sobel filter, and a distribution of the edge components 40, 40, . . . within the 3×3 range is linearly approximated by the method of least squares. At this time, an approximate straight line 41 is linearly approximated so as to pass through an original point (0, 0). In this case, the approximate straight line 41 can be expressed by a formula (1):

$$ax+by=0 \qquad (1)$$

where a2+b2=1

When an edge component in the X-direction and an edge component in the Y-direction are respectively "xi" and "yi" in an i-th pixel, a square sum E of errors 42 between the edge components 40, 40, . . . in the respective pixels and the approximate straight line 41 can be calculated by a formula (2):

[Mathematical Formula 1]

$$E = \sum_{i=1}^{n} (ax_i + by_i)^2 \qquad (2)$$

In order to obtain "a" and "b" which minimize the square sum E of the errors 42 under the condition of satisfying the formula: a2+b2=1, it is necessary to solve an eigenvalue problem of a formula (3) by use of Lagrange multipliers:

[Mathematical Formula 2]

$$Sa = \lambda a \qquad (3)$$

$$S = D^T D = \begin{pmatrix} \sum_{i=1}^{n} x_i^2 & \sum_{i=1}^{n} x_i y_i \\ \sum_{i=1}^{n} x_i y_i & \sum_{i=1}^{n} y_i^2 \end{pmatrix}$$

$$D = \begin{pmatrix} x_1 & y_1 \\ x_2 & y_2 \\ \cdots & \cdots \\ x_n & y_n \end{pmatrix}$$

$$a = \begin{pmatrix} a \\ b \end{pmatrix}$$

When the eigenvalue problem shown in the formula (3) is solved and "λ" as the minimum value is thus calculated, the calculation is made as shown in a formula (4):

[Mathematical Formula 3]

$$\lambda = \frac{(\sum x_i^2 + \sum y_i^2) - \sqrt{(\sum x_i^2 + \sum y_i^2)^2 + 4(\sum x_i y_i)^2}}{2} \qquad (4)$$

Since the minimum value λ of the square sum E of the errors 42, calculated in the formula (4), is calculated based upon the total sum of the errors 42, the calculation is made in the state of including the edge strength. Therefore, it is preferable to use a value Var, normalized by dividing a total sum of the edge strengths, as the degree of variation in edge angle. This is because the normalization allows calculation of the degree of variation in edge angle independent of the edge strength. Namely, in a case of a degree of variation at the same level, a value at the same level can be obtained irrespective of the magnitude of the edge strength. A formula (5) is a formula for obtaining the normalized degree Var of variation:

[Mathematical Formula 4]

$$Var = \frac{\lambda}{\sum x_i^2 + \sum y_i^2} \qquad (5)$$

A synthesizing rate Rate of a multi-valued image and a smoothed reduced image is calculated by a formula (6) by use of the degree Var of variation in edge angle, calculated in the formula (5). It is to be noted that the synthesizing rate Rate is calculated in pixel units and expresses a weight (0 to 1) in the smoothed reduced image. The larger the value of the synthesizing rate Rate, the larger influence the smoothed reduced image has, and the smaller the value, the larger influence the multi-valued image has.

[Mathematical Formula 5]

$$\text{Rate} = (\text{Var} - \text{Offset}) \times \text{Gain} \quad (6)$$

In the formula (6), "Offset" is a parameter for ignoring a degree of variation not larger than a fixed value, and "Gain" is a parameter for adjusting a degree of influence by a smoothing-processed image. The synthesizing rate Rate is subjected to clipping processing to be set to 0 (zero) in a case of taking a value not larger than 0(zero), and set to 1 in a case of taking a value not smaller than 1.

Returning to FIG. 2, the main control section 21 of the image generating apparatus 2 generates an enlarged image by enlarging the smoothed reduced image to the identical scale as the multi-valued image (Step S207). Such an enlarged image becomes a direct object to be synthesized with the original multi-valued image.

The main control section 21 converts the synthesizing rate calculated in pixel units of the reduced image into a synthesizing rate in pixel units of the generated enlarged image (Step S208). Specifically, for example by use of Bilinear Interpolation, a luminance value of a pixel newly generated by expansion by weighed averaging of the nearest four points before the expansion may be interpolated.

Based upon the converted synthesizing rate, the main control section 21 synthesizes the multi-valued image and the enlarged image having been enlarged (Step S209), and displays and outputs the synthesized image onto the display apparatus 3 (Step S210). In the case of synthesizing the multi-valued image and the enlarged image having been enlarged, a luminance value of each pixel of the synthesized image is calculated, for example, in accordance with a formula (7).

[Mathematical Formula 6]

$$C_{ij} = A_{ij} \times (1 - R_{ij}) + B_{ij} \times \text{Rate}_{ij} \quad (7)$$

In the formula (7), "$C_{ij}$" denotes a luminance value at an arbitrary pixel (i, j) of the synthesized image, "$A_{ij}$" denotes a luminance value at an arbitrary pixel (i, j) of the original multi-valued image, "$B_{ij}$" denotes a luminance value at an arbitrary pixel (i, j) of the smoothed reduced image, and "$\text{Rate}_{ij}$" denotes a synthesizing rate at an arbitrary pixel (i, j).

Figure 5A:
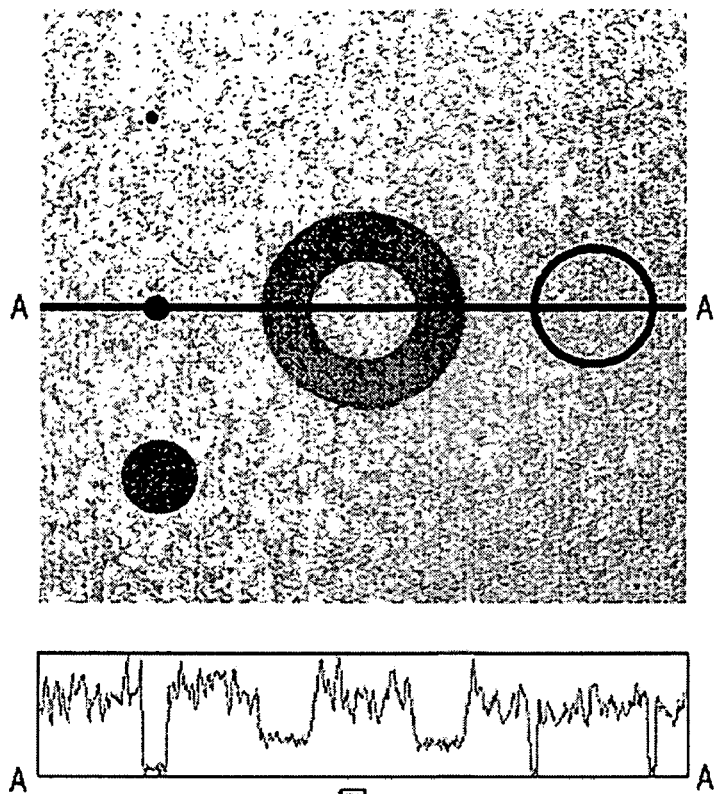
FIGS. 5A and 5B are comparative views between an original image and a synthesized image in the image generating apparatus according to the first embodiment.
Figure 5B:
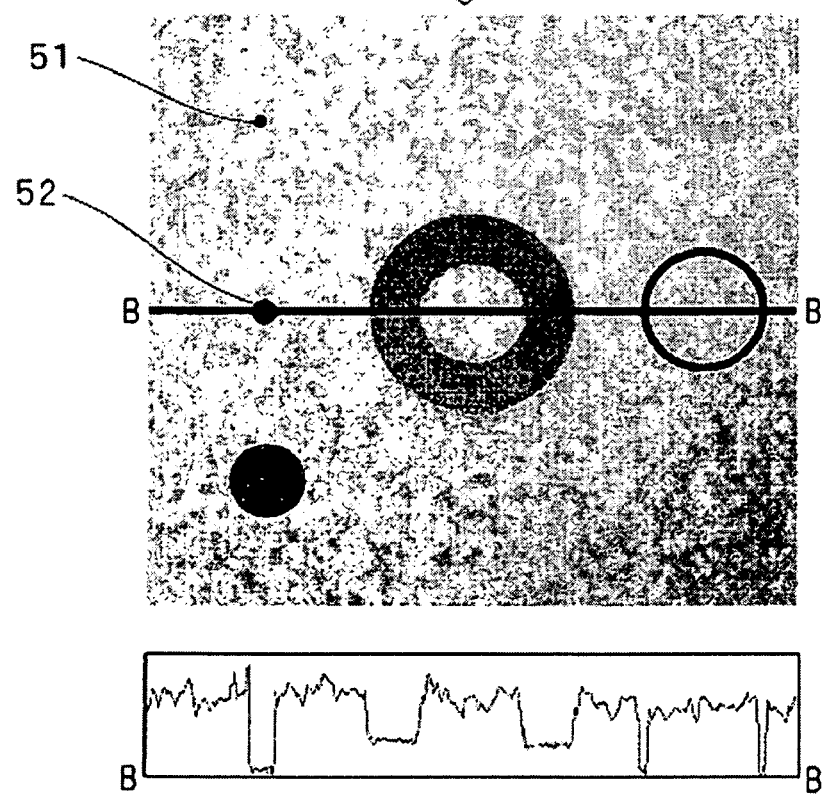

FIGS. 5A and 5B are comparative views between an original multi-valued image and a synthesized image in the image generating apparatus 2 according to the first embodiment. FIG. 5A shows the original multi-valued image and a luminance value distribution along an A-A section of the original multi-valued image, and FIG. 5B shows the synthesized image and a luminance value distribution along a B-B section of the synthesized image.

As found from the comparison between FIGS. 5A and 5B, particularly from observation of the luminance value distributions, a noise portion smaller than a certain size has been deleted without blurring the edge portion. It is found, however, that with a reduction ratio of FIG. 5, noise portions 51, 52 of sizes not smaller than the certain size are determined as the same as the edge portion and thus have been clearly left. It goes without saying that, when the noise portions 51, 52 become smaller than the certain size by increasing the reduction ratio at which the reduced image is generated, the noise portions 51, 52 are deleted as in the same manner as the other noise portion.

Figure 6:
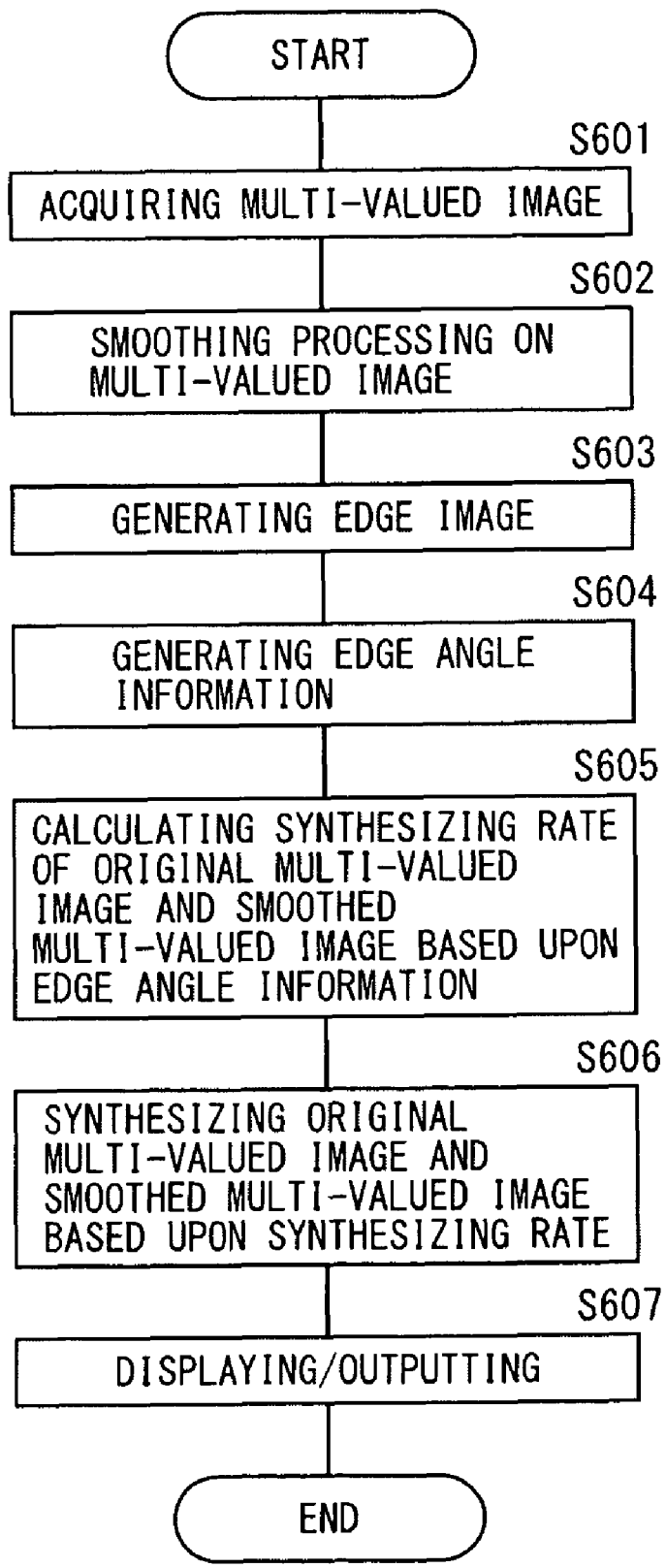
FIG. 6 is a flowchart showing a processing procedure for the main control section of the image generating apparatus in a case of executing smoothing processing on an original multi-valued image.

It should be noted that not only the synthesizing rate of the smoothing-processed reduced image and the original multi-valued image is calculated as described above, but also the smoothing processing may be executed on the original multi-valued image and a synthesizing rate of the smoothing-processed image and the original multi-valued image may be calculated FIG. 6 is a flowchart showing a procedure for processing of the main control section 21 of the image generating apparatus 2 in a case of executing the smoothing processing on the original multi-valued image.

As shown in FIG. 6, the main control section 21 of the image generating apparatus 2 acquires a multi-valued image picked up by the camera 1 (Step S601), and executes the smoothing processing on the acquired multi-valued image (Step S602). Meanwhile, the main control section 21 generates an edge image based upon the original multi-valued image (Step S603), and generates edge angle information concerning the edge angle in pixel units from the generated edge image (Step S604).

Based upon the generated edge angle information, the main control section 21 calculates a synthesizing rate of the original multi-valued image and the smoothed multi-valued image in pixel units of the multi-valued image (Step S605). Namely, in a pixel with a larger degree of variation in edge angle, an image is synthesized at a larger ratio of a smoothing-processed image, so that the noise portion can be deleted.

Based upon the calculated synthesizing rate, the main control section 21 synthesizes the original multi-valued image and the smoothed multi-valued image (Step S606), and displays and outputs the synthesized image onto the display apparatus 3 (Step S607).

FIGS. 7A and 7B are comparative views among an original multi-valued image, a smoothed multi-valued image, and a synthesized image in the image generating apparatus 2 according to the first embodiment. FIG. 7A shows the original multi-valued image and a luminance value distribution along an A-A section of the original multi-valued image, and FIG. 7B shows the synthesized image and a luminance value distribution along a B-B section of the synthesized image.

As found from the comparison between FIGS. 7A and 7B, particularly from observation of the luminance value distributions, a minute noise portion of a size smaller than a certain size has been deleted without blurring the edge portion. Therefore, pre-processing to make a portion likely to be the edge portion clearer and deleting a portion less likely to be the edge portion is executed on a multi-valued image to be the original multi-valued image.

Further, the synthesis of the original multi-valued image with the smoothed multi-valued image and the synthesis with the smoothed reduced image may be successively executed. Namely, as the synthesized image, a first synthesized image is generated from the original multi-valued image and the smoothed multi-valued image based upon a calculated synthesizing rate, and thereafter, with respect to the first synthesized image, an enlarged image is synthesized based upon a synthesizing rate of the multi-valued image and the smoothed reduced image which was further converted by the foregoing processing. In this manner, it is possible to generate the synthesized image in a state with clearer distinction between the edge portion and the non-edge portion, so as to make the edge portion clearer and delete the noise portion more reliably.

Moreover, the reduced image obtained by reducing a multi-valued image is not restricted to a reduced image reduced at one reduction ratio, but reduced images reduced at a plurality of reduction ratios may be used. In this case, a plurality of reduction ratios may be previously stored into the storage device 23, or a plurality of reduction ratios may be previously stored and selection by the user may be accepted, for example, in a reduction ratio selection accepting device.

In a case of using a plurality of reduction ratios, a concept of hierarchization of images as shown below is employed. It is assumed for example that in a case of using four kinds of reduction ratios of 1/1, 1/2, 1/4 and 1/6, a hierarchy 0 is processing performed at the reduction ratio of 1/1, a hierarchy 1 is processing performed at the reduction ratio of 1/2, a hierarchy 2 is processing performed at the reduction ratio of 1/4, and a hierarchy 3 is processing performed at the reduction ratio of 1/6. As thus described, a hierarchy number is sequentially allocated in the increasing order of reduction ratios from a case of the small reduction ratio (reduction ratio: 1/1).

It is to be noted that the processing at the reduction ratio of 1/1 means processing using a multi-valued image that is not reduced. Further, in a case of accepting selection of a reduction ratio of 1/8 by the user, in the present embodiment, processing are performed at each of the reduction ratios of 1/1, 1/2, 1/4, 1/6 and 1/8 based upon a previously set order of reduction ratios.

The main control section 21 hierarchically generates reduced images in accordance with the concept of hierarchization on the basis of accepted reduction ratios, and executes the foregoing image synthesizing processing on the respective reduced images. The image synthesizing processing is sequentially executed from the hierarchy 0 to the higher hierarchies. As the multi-valued image used for synthesis in each hierarchy, a synthesized image in a one lower hierarchy is used. It is to be noted that, since the hierarchy 0 is the lowest layer, the original multi-valued image is used as the multi-valued image for use in synthesis.

With the use of a plurality of reduced images, it is possible to execute the image synthesizing processing based upon determination according to each reduction ratio, using a reduced image with a large reduction ratio (e.g. the reduction ratio of 1/6 is defined as larger than the reduction ratio of 1/2) for a large-sized noise portion and using reduced image with a small reduction ratio (e.g. the reduction ratio of 1/2 is defined as smaller than the reduction ratio of 1/6) for a small-sized noise portion, so that noise portions of a variety of sizes according to reduction ratios can be deleted while the edge portion is held.

Specifically, the following processing is executed. In a case where a synthesized image in an n-th hierarchy is "Rslt[n](i, j)", a synthesizing rate in the n-th hierarchy is "Rate[n](i, j)", and a smoothed image (expanded image) in the n-th hierarchy is "Smth[n](i, j)", a synthesized image to be obtained is calculated by a recurrence formula (8):

$$Rslt[n](i, j) = \\ Rslt[n-1](i, j) \times (1 - Rate[n](i, j)) + Smth[n](i, j) \times Rate[n](i, j) \quad (8)$$

In the formula (8), "i" and "j" represent the X coordinate and the Y coordinate. Further, "Rslt[n−1]" in the case of n=0, namely Rslt[−1] (synthesized image in a hierarchy −1) represents the original multi-valued image.

Image synthesizing processing in a certain hierarchy (hierarchy n) is executed on a synthesized image in a one lower hierarchy (hierarchy n−1) and a smoothed and enlarged image (enlarged image) in the hierarchy (hierarchy n) based upon a synthesizing rate calculated in accordance with a reduction ratio in the hierarchy (hierarchy n). The synthesized image generated in the hierarchy (hierarchy n) is used in synthesizing processing in a one higher hierarchy (hierarchy n+1), and therefore, the image synthesizing processing is sequentially executed from the lower hierarchy toward the higher hierarchy. With such a series of synthesizing processing, more local determination which cannot be made based upon some specific hierarchy is made through use of a result of the processing in the lower hierarchy, and more comprehensive determination can be made depending upon a result of the processing in the higher hierarchy.

It is to be noted that execution of the image synthesizing processing is not necessarily restricted to execution of sequential synthesizing processing as in the recurrence formula (8), but the synthesizing processing may be executed such that every image (Rslt[−1], Smth[0], Smth[1], . . . , Smth[n]) for use in the synthesizing processing is previously generated and a synthesizing rate with respect to each image is also previously calculated in block, to execute the image synthesizing processing at once.

Figure 8:
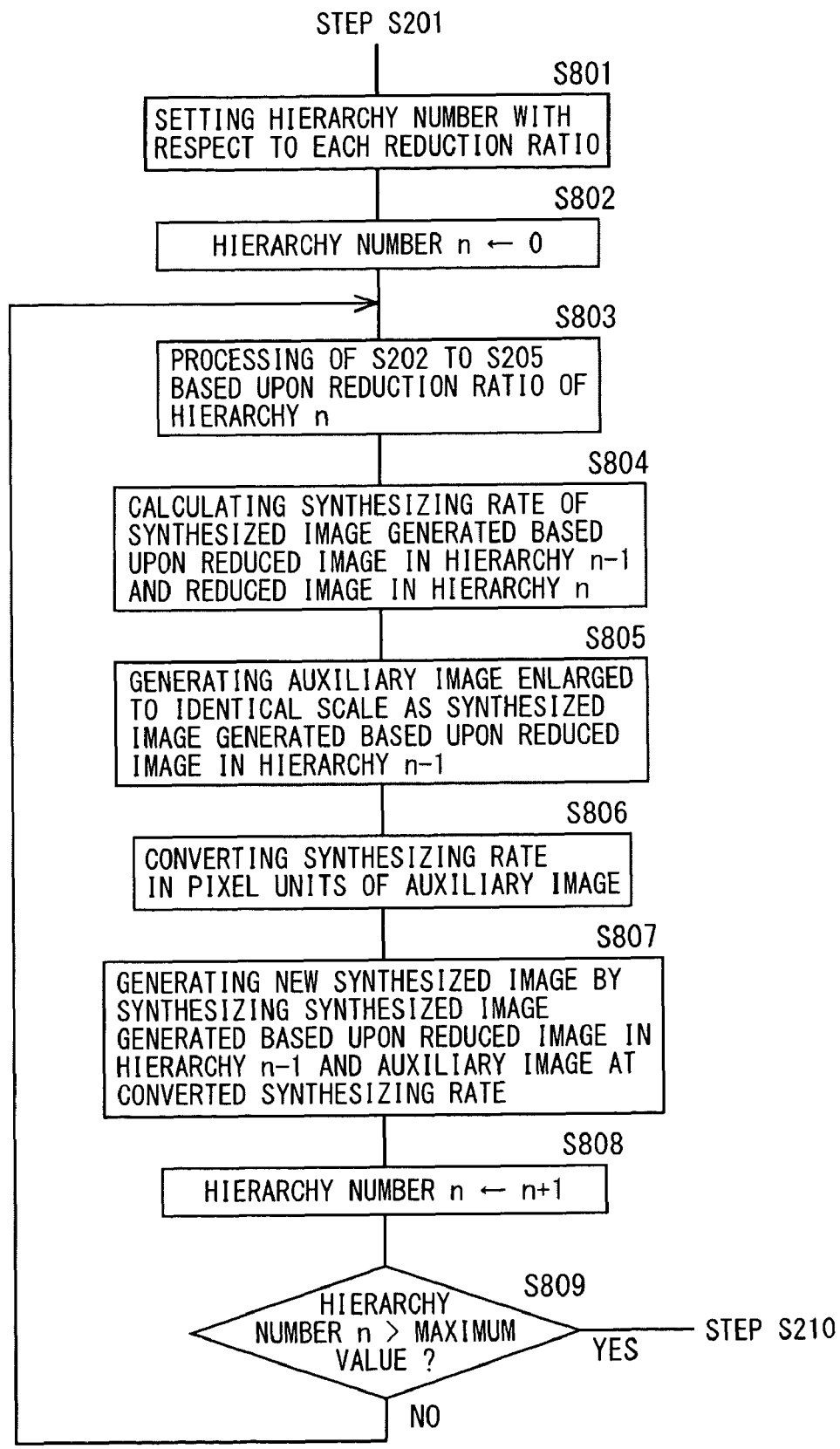
FIG. 8 is a flowchart showing a procedure for image synthesizing processing in a case of sequentially generating synthesized images by use of a plurality of hierarchies in the main control section of the image generating apparatus according to the first embodiment.

FIG. 8 is a flowchart showing a procedure for the image synthesizing processing in a case of sequentially generating synthesized images by use of a plurality of hierarchies in the main control section 21 of the image generating apparatus 2 according to the first embodiment. As shown in FIG. 8, the main control section 21 of the image generating apparatus 2 according to the first embodiment acquires a multi-valued image picked up by the camera 1. Next, the main control section 21 sets hierarchy numbers (n=0, 1, 2, . . . ) with respect to respective reduction ratios in the increasing order of reduction ratios (Step S801), and sets an initial value of the hierarchy number that identifies a hierarchy to 0 (Step S802). For example, when the reduction ratios are 1/1, 1/2, 1/4, and 1/6, the main control section 21 sets a hierarchy 0, a hierarchy 1, a hierarchy 2 and a hierarchy 3 sequentially from the reduction ratio 1/1.

The main control section 21 executes processing of Steps S202 to S205 of FIG. 2 based upon the reduction ratio of the hierarchy n (Step S803). The content of the image reduction processing is not particularly restricted. For example, the known area averaging method may be used. Further, the content of the smoothing processing is not particularly restricted, either. For example, in the same manner as conventionally done, an averaging filter, a Gaussian filter or the like may be used, a median filter may be used, or the smoothing processing disclosed in "Edge Preserving Smoothing" described above may be executed.

The main control section 21 calculates a synthesizing rate of a synthesized image generated based upon a reduced image in the hierarchy n−1 and a reduced image in the hierarchy n which was smoothed and has a next large reduction ratio in pixel units on the basis of the generated edge angle information (Step S804). Namely, in a pixel with a larger degree of variation in edge angle, an image is synthesized at a larger ratio of a smoothing-processed image, so that the noise portion can be deleted.

It should be noted that the processing in the case of n=0, namely in the hierarchy 0 (reduction ratio: 1/1), a synthesized image generated in the hierarchy −1 is used, for a synthesized image in the hierarchy −1, an original multi-valued image is used (corresponding to Rslt[−1] in the formula (8)). Further, the reduced image with the reduction ratio 1/1 is equivalent to the original multi-valued image itself without reduction. Namely, the processing in the hierarchy 0 is generating a synthesized image of the original multi-valued image (reduction ratio: 1/1) and the smoothed image.

The main control section 21 generates an auxiliary image by enlarging the smoothed reduced image in the hierarchy n to the identical scale as a synthesized image generated based upon the reduced image in the hierarchy n−1 (Step S805). The main control section 21 converts the synthesizing rate calculated based upon the reduced image in the hierarchy n into a synthesizing rate in pixel units of the generated auxiliary image (Step S806). Specifically, for example, by use of Bilinear Interpolation, a luminance value of a pixel newly generated by expansion by weighed averaging of the nearest four points before the expansion may be interpolated.

The main control section 21 generates a new synthesized image by synthesizing the synthesized image generated based upon the reduced image in the hierarchy n−1 and the auxiliary image on the basis of the converted synthesizing rate (Step S807), and increments the hierarchy number n by one (Step S808). The main control section 21 determines whether or not the hierarchy number n has exceeded the maximum value of the hierarchy number set in Step S801 (Step S809), and when determining that the hierarchy number n has not exceeded the maximum value (Step S809: NO), the main control section 21 returns the processing to Step S803 and repeats the foregoing processing.

When determining that the hierarchy number n has exceeded the maximum value (Step S809: YES), the main control section 21 determines that the synthesized image is a final synthesized image, and displays and outputs the generated synthesized image onto the display apparatus 3 (Step S210).

In the foregoing processing, the reduction ratio may increase at a fixed ratio, or may increase at random. Further, the reduction ratio of 1/1 is not necessarily included. In any case, synthesized images are generated sequentially from the reduced image with the smallest reduction ratio.

As thus described, from the reduced image with the smallest reduction ratio, a synthesizing rate of a reduced image with a next large reduction ratio is calculated, to synthesize an image. Synthesizing rates are sequentially calculated and the image synthesizing device is repeated, thereby to execute the image synthesizing processing based upon determination in accordance with the respective reduction ratios, so that noise portions of a variety of sizes in accordance with reduction ratios can be deleted while the edge portion is held.

Figure 9A:
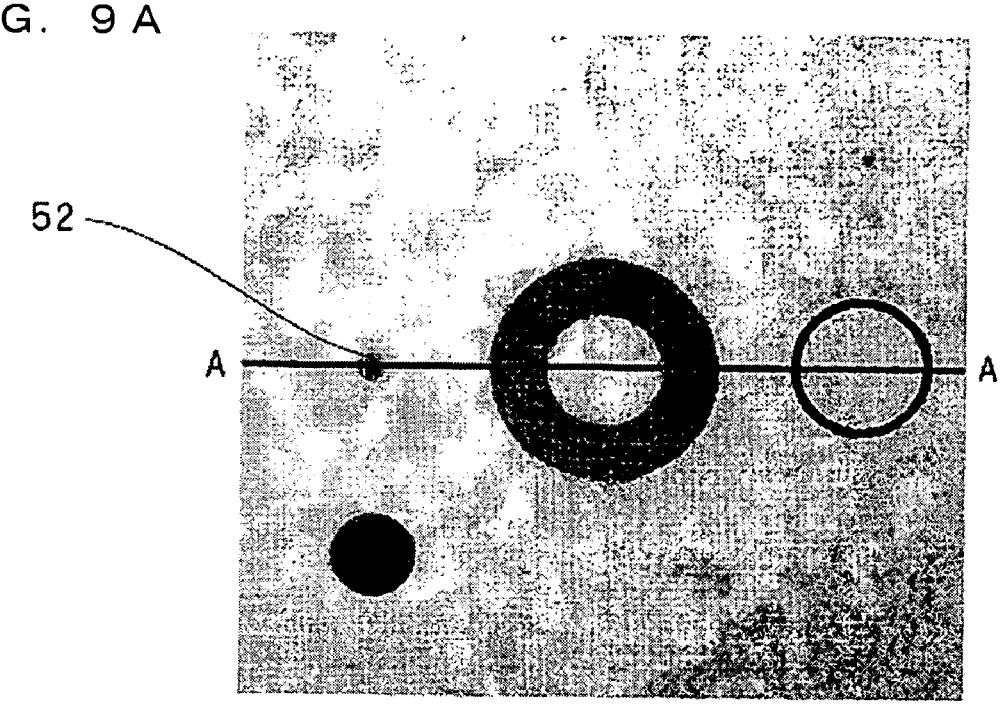
FIGS. 9A and 9B are exemplary views of a synthesized image generated based upon a plurality of reduced images reduced at three different reduction ratios in the image generating apparatus according to the first embodiment.
Figure 9B:
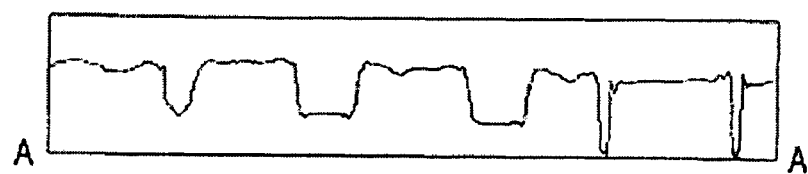

FIGS. 9A and 9B are exemplary views of a synthesized image generated based upon a plurality of reduced images reduced at three different reduction ratios in the image generating apparatus 2 according to the first embodiment. FIG. 9A shows a synthesized image, and FIG. 9B shows a luminance value distribution along an A-A section of the synthesized image.

As found from the comparison between FIGS. 9A and 9B, out of the noise portions 51, 52 which are left in FIG. 5, the noise portion 51 of a smaller size has been deleted. Further, the noise portion 52 of a larger size can also be deleted by increasing the number of hierarchies of the reduction ratio.

Figure 10A:
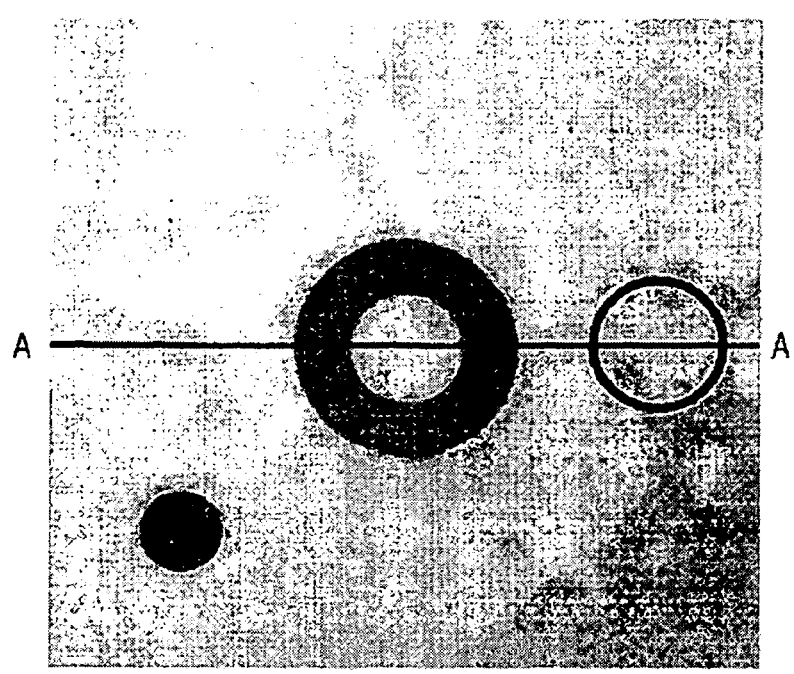
FIGS. 10A and 10B are exemplary views of a synthesized image generated based upon a plurality of reduced images reduced at five different reduction ratios in the image generating apparatus according to the first embodiment.
Figure 10B:
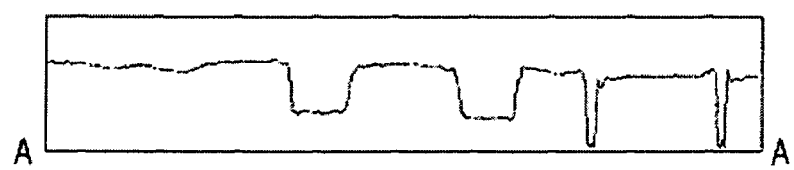

FIGS. 10A and 10B are exemplary views of a synthesized image generated based upon a plurality of reduced images reduced at five different reduction ratios in the image generating apparatus 2 according to the first embodiment. FIG. 10A shows a synthesized image, and FIG. 10B shows a luminance value distribution along an A-A section of the synthesized image.

As found from the comparison between FIGS. 10A and 10B, both the noise portions 51, 52 which are left in FIGS. 5 and 9 have been reliably deleted. As thus described, it is possible to reduce a noise portion of a size not larger than a certain size by increasing the number of hierarchies of the reduction ratio.

According to the first embodiment as thus described, performing the smoothing processing on a reduced image makes a local noise portion difficult to pickup, thereby enabling distinction between a portion likely to be the edge portion and a portion less likely to be the edge portion in accordance with the edge angle information. Therefore, a synthesizing rate is calculated such that a portion less likely to be the edge portion has a higher synthesizing rate of the smoothed image, whereby the noise portion can be reliably deleted while the edge portion is clearly held.

Figure 11:
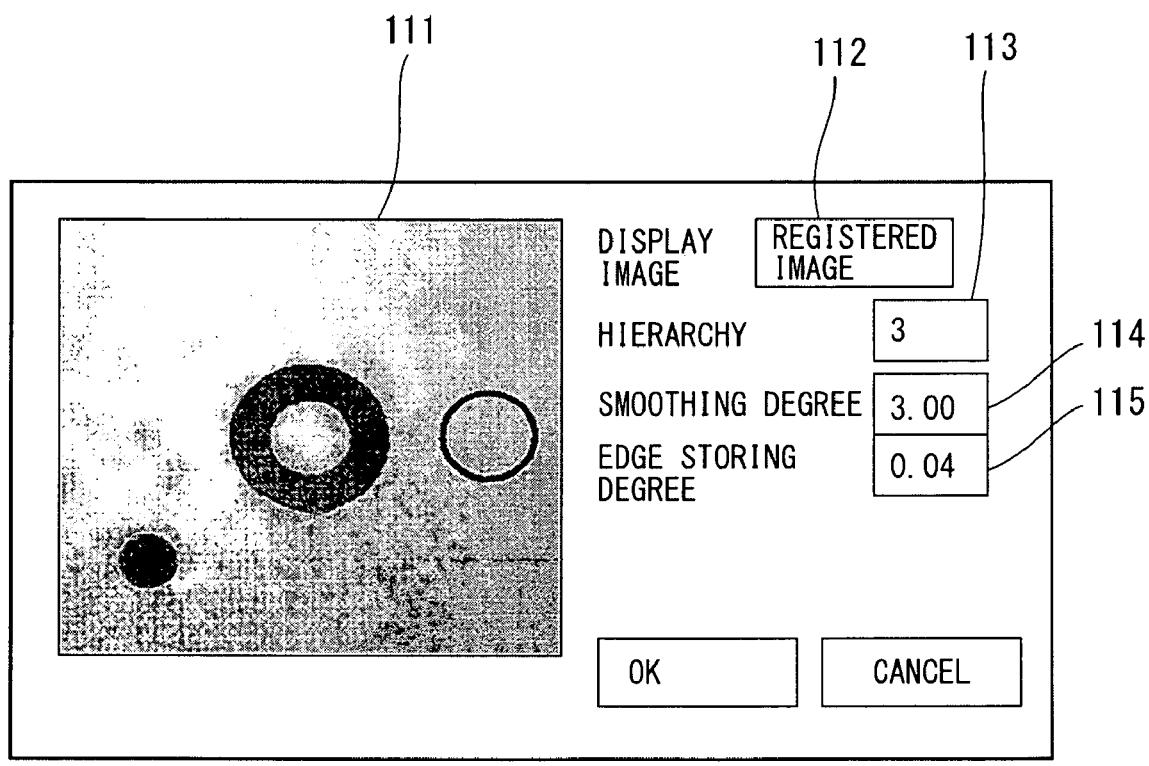
FIG. 11 is an exemplary view of a user interface displayed on a display apparatus.

It is to be noted that two parameters "Offset" and "Gain" in the formula (6) may be previously stored into the storage device 23, or appropriate values thereof may be inputted by the user. FIG. 11 is an exemplary view of a user interface displayed on the display apparatus 3.

As shown in FIG. 11, a synthesized image or an original multi-valued image is displayed in an image display region 111. In the example of FIG. 11, a synthesized image generated in a case of using a plurality of reduced images is displayed. Further, in a display image selection region 112, an image to be used for checking a processing state is selected. For example, "Registered Image" is selected in a case of using an image previously registered in the storage device 23, and "Input Image" is selected in a case of using an image that is captured at arbitrary timing.

In a hierarchy input region 113, how many hierarchies of the reduced image to be prepared, namely how many reduction ratios to be specified, is inputted. In a smoothing degree region 114, a value of "Gain" as a parameter for adjusting the degree of influence of a smoothing-processed image is inputted. In an edge storing degree region 115, "Offset" as a parameter for ignoring a degree of variation not larger than a fixed value, as well as a parameter for adjusting a degree of influence of the processed image is inputted. Every time input values of two parameters fluctuate, the synthesized image is recalculated, and displayed and outputted onto the image display region 111. In this manner, it is possible to specify a parameter capable of effectively deleting an unnecessary noise portion through trial and error.

Second Embodiment

Since a configuration of the image generating apparatus 2 according to a second embodiment of the present invention is similar to the first embodiment, the same reference numerals are provided thereto and the specific descriptions thereof are not given. The second embodiment is different from the first embodiment in that a synthesizing rate of an original multi-valued image and a smoothing-processed image is calculated based upon an edge strength calculated in accordance with a degree of fluctuation in luminance value in a reduced image having been reduced, to generate an image with a noise portion deleted.

Figure 12:
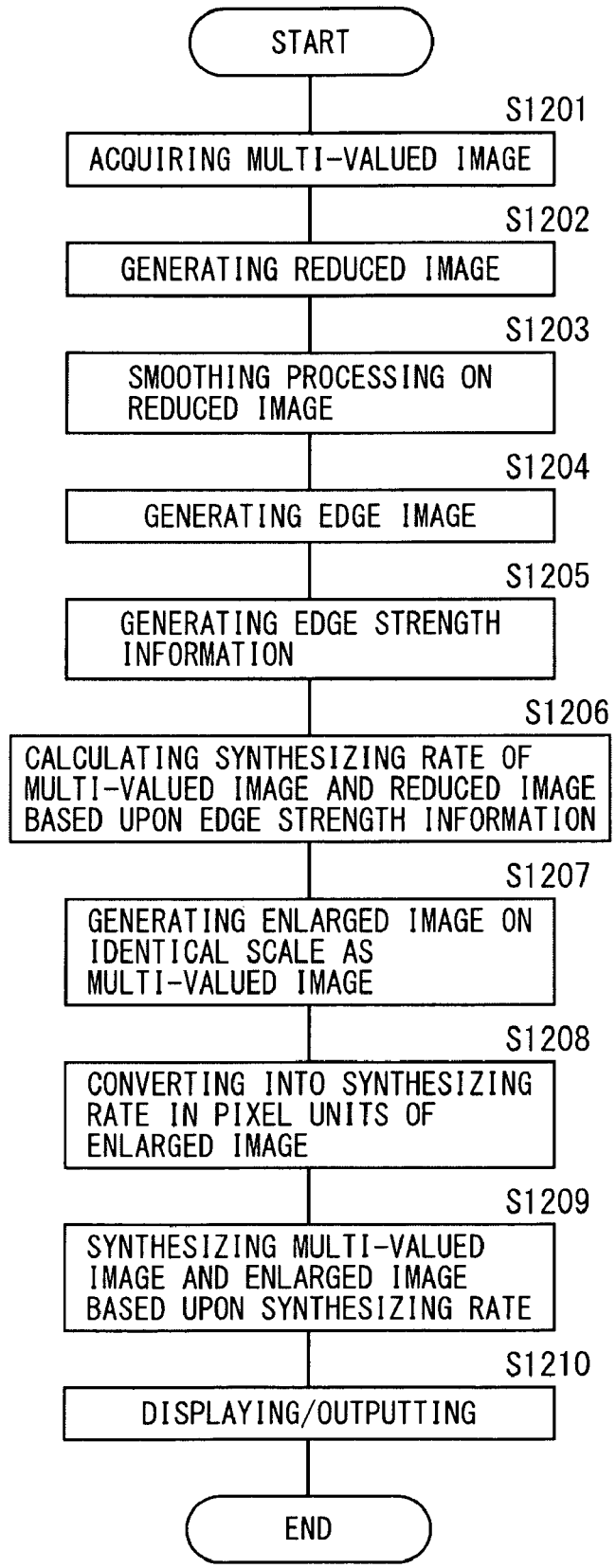
FIG. 12 is a flowchart showing a processing procedure for a main control section of an image generating apparatus according to a second embodiment of the present invention.

FIG. 12 is a flowchart showing a procedure for processing of the main control section 21 of the image generating apparatus 2 according to the second embodiment of the present invention. As shown in FIG. 12, the main control section 21 of the image generating apparatus 2 according to the second embodiment acquires a multi-valued image picked up by the camera 1 (Step S1201), and generates a reduced image by reducing the acquired multi-valued image at a prescribed reduction ratio (Step S1202). The main control section 21 executes smoothing processing on the reduced image having been reduced (Step S1203).

The content of the image reduction processing is not particularly restricted. For example, the known area averaging method may be used. Further, the content of the smoothing processing is also not particularly restricted, either. For example, as in the conventional manner, an averaging filter, a Gaussian filter, or the like may be used, a median filter may be used, or the smoothing processing disclosed in "Edge Preserving Smoothing" described above may be executed.

Meanwhile, the main control section 21 generates an edge image based upon the reduced image having been reduced (Step S1204), and from the generated edge image, the main control section 21 generates edge strength information concerning edge strengths in pixel units (Step S1205).

An edge strength is calculated in accordance with a degree of fluctuation in luminance value. Namely, a derivative value is calculated based upon a luminance value of each pixel and luminance values of peripheral pixels, and based upon the calculated derivative value, an edge strength is calculated. In a portion with a large edge strength, since the portion is likely to be non-noise portion, the synthesizing rate of the multi-valued image is increased. In a portion with a small edge strength, since the portion is likely to be the noise portion, the synthesizing rate of the enlarged image after the smoothing processing is increased, so that only the noise portion can be reliably deleted while the edge portion is clearly held.

The main control section 21 calculates a synthesizing rate of the multi-valued image and the smoothed reduced image in pixel units of the reduced image based upon the generated edge strength information (Step S1206). The main control section 21 generates an enlarged image by enlarging the smoothed reduced image to the identical scale as the multi-valued image (Step S1207). Such an enlarged image becomes a direct object to be synthesized with the original multi-valued image.

The main control section 21 converts the synthesizing rate calculated in pixel units of the reduced image into a synthesizing rate in pixel units of the generated enlarged image (Step S1208). Specifically for example, by use of Bilinear Interpolation, a luminance value of a pixel newly generated by expansion by weighed averaging of the nearest four points before the expansion may be interpolated.

Based upon the converted synthesizing rate, the main control section 21 synthesizes the multi-valued image and the enlarged image (Step S1209), and displays and outputs the synthesized image onto the display apparatus 3 (Step S1210).

It should be noted that, as in the first embodiment, not only the synthesizing rate of the smoothing-processed reduced image and the original multi-valued image is calculated, but also the smoothing processing is executed on the original multi-valued image and a synthesizing rate of the smoothing-processed image and the original multi-valued image may be calculated.

Further, the synthesis of the original multi-valued image with the smoothed multi-valued image and the synthesis with the smoothed reduced image may be successively executed. Namely, as the synthesized image, a first synthesized image is generated from the original multi-valued image and the smoothed multi-valued image based upon a calculated synthesizing rate, and thereafter, an enlarged image is synthesized with respect to the first synthesized image based upon a synthesizing rate of the multi-valued image and the smoothed reduced image which was further converted by the foregoing processing. In this manner, it is possible to generate the synthesized image in a state with clearer distinction between the edge portion and the non-edge portion, so as to make the edge portion clearer and delete the noise portion more reliably.

Moreover, the reduced image obtained by reducing a multi-valued image is not restricted to a reduced image reduced at one reduction ratio, but reduced images reduced at a plurality of reduction ratios may be used. In this case, a plurality of reduction ratios may be previously stored into the storage device 23, or a plurality of reduction ratios may be previously stored and selection by the user may be accepted, for example, in a reduction ratio selection accepting device.

With the use of a plurality of reduced images, it is possible to execute the image synthesizing processing based upon determination according to each reduction ratio, using a reduced image with a large reduction ratio (the reduction ratio of 1/6 rather than the reduction ratio of 1/2, etc.) for a large-sized noise portion, and using a reduced image with a small reduction ratio (the reduction ratio of 1/2 rather than the reduction ratio of 1/6, etc.) for a small-sized noise portion, so that noise portions of a variety of sizes according to reduction ratios can be deleted while the edge portion is held.

It is to be noted that execution of the image synthesizing processing is not necessarily restricted to execution of sequential synthesizing processing as in the recurrence formula (8), but the synthesizing processing may be executed such that every image (Rslt[−1], Smth[0], Smth[1], . . . , Smth[n]) for use in the synthesizing processing is previously generated and a synthesizing rate with respect to each image is also previously calculated in block, to execute the image synthesizing processing at once.

Further, the reduction ratio may increase at a fixed ratio, or may increase at random. Moreover, the reduction ratio of 1/1 is not necessarily included. In any case, synthesized images are generated sequentially from the reduced image with the smallest reduction ratio.

As thus described, from the reduced image with the smallest reduction ratio, a synthesizing rate of a reduced image with a next large reduction ratio is calculated, to synthesize an image. Synthesizing rates are sequentially calculated and the image synthesizing device is repeated, thereby to execute the image synthesizing processing based upon determination in accordance with the respective reduction ratios, so that noise portions of a variety of sizes in accordance with reduction ratios can be deleted while the edge portion is held.

As thus described, according to the second embodiment, performing the smoothing processing on the reduced image makes a local noise portion difficult to pickup, thereby enabling distinction between a portion likely to be the edge portion and a portion less likely to be the edge portion in accordance with the edge angle information. Therefore, the synthesizing rate is calculated such that a portion less likely to be the edge portion has a higher synthesizing rate of the smoothed image, whereby the noise portion can be reliably deleted while the edge portion is clearly held.

It is to be noted that, as in the first embodiment, two parameters "Offset" and "Gain" in the formula (6) may be previously stored into the storage device 23, or appropriate values thereof may be inputted by the user. The user interface is also the same as in the first embodiment, and the detailed description thereof is thus not given.

Third Embodiment

Since a configuration of the image generating apparatus according to a third embodiment of the present invention is similar to the first embodiment, the same reference numerals are provided thereto and the specific descriptions thereof are not given. The third embodiment is different from the first and second embodiments in that a synthesizing rate of an original multi-valued image and a smoothing-processed image is calculated based upon dispersion of luminance values in a prescribed region in a reduced image having been reduced, to generate an image with a noise portion deleted.

Figure 13:
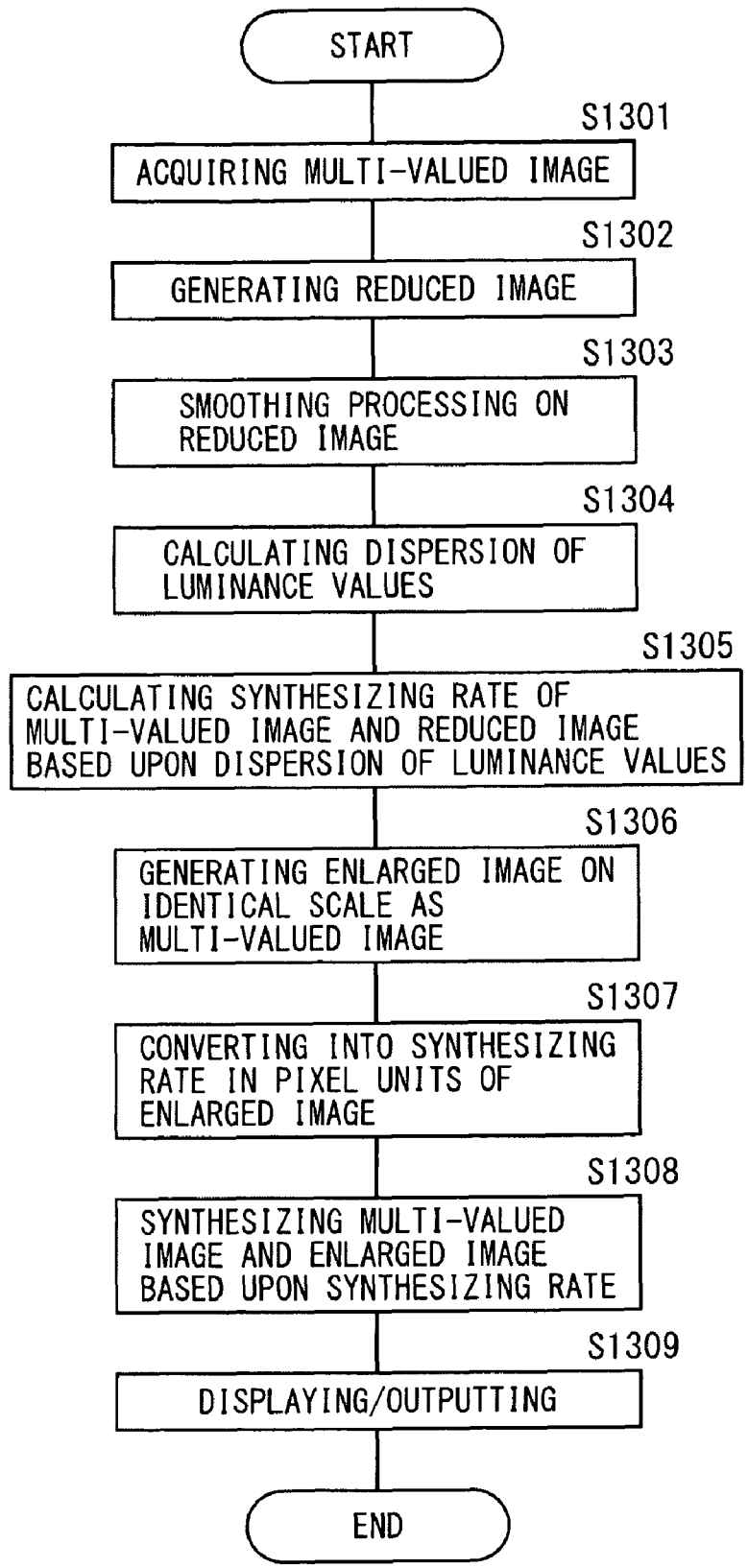
FIG. 13 is a flowchart showing a processing procedure for a main control section of an image generating apparatus according to the third embodiment of the present invention.

FIG. 13 is a flowchart showing a procedure for processing of the main control section 21 of the image generating apparatus 2 according to the third embodiment of the present invention. As shown in FIG. 13, the main control section 21 of the image generating apparatus 2 according to the third embodiment acquires a multi-valued image picked up by the camera 1 (Step S1301), and generates a reduced image by reducing the acquired multi-valued image at a prescribed reduction ratio (Step S1302). The main control section 21 executes smoothing processing on the reduced image having been reduced (Step S1303).

The content of the image reduction processing is not particularly restricted. For example, the known area averaging method may be used. Further, the content of the smoothing processing is not particularly restricted, either. For example, in the same manner as conventionally done, an averaging filter, a Gaussian filter or the like may be used, a median filter may be used, or the smoothing processing disclosed in "Edge Preserving Smoothing" described above may be executed.

Meanwhile, the main control section 21 calculates dispersion of the luminance values in a region formed of a prescribed pixel and pixels adjacent to the pixel (Step S1304). For example, the main control section 21 calculates dispersion of the luminance values in a region of a 3×3 pixel in every region of the reduced image. In a portion with higher dispersion of the luminance values, since the portion is likely to be non-noise portion, the synthesizing rate of the multi-valued image is increased. In a portion with lower dispersion of the luminance values, since the portion is likely to be the noise portion, the synthesizing rate of the enlarged image after the smoothing processing is increased, so that only the noise portion can be reliably deleted while the edge portion is clearly held.

The main control section 21 calculates a synthesizing rate of the multi-valued image and the smoothed reduced image in pixel units of the reduced image based upon the calculated dispersion of the luminance values (Step S1305). The main control section 21 generates an enlarged image by enlarging the smoothed reduced image to the identical scale as the multi-valued image (Step S1306). Such an enlarged image becomes a direct object to be synthesized with the original multi-valued image.

The main control section 21 converts the synthesizing rate calculated in pixel units of the reduced image into a synthesizing rate in pixel units of the generated enlarged image (Step S1307). Specifically, for example, by use of Bilinear Interpolation, a luminance value of a pixel newly generated by expansion by weighed averaging of the nearest four points before the expansion may be interpolated.

Based upon the converted synthesizing rate, the main control section 21 synthesizes the multi-valued image and the enlarged image having been enlarged (Step S1308), and displays and outputs the synthesized image onto the display apparatus 3 (Step S1309).

It should be noted that, as in the first and second embodiments, not only the synthesizing rate of the smoothing-processed reduced image and the multi-valued image is calculated, but also the smoothing processing is executed on the original multi-valued image and a synthesizing rate of the smoothing-processed image and the original multi-valued image may be calculated.

Further, the synthesis of the original multi-valued image with the smoothed multi-valued image and the synthesis with the smoothed reduced image may be successively executed. Namely, as the synthesized image, a first synthesized image is generated from the original multi-valued image and the smoothed multi-valued image based upon a calculated synthesizing rate, and thereafter, an enlarged image is synthesized with respect to the first synthesized image based upon a synthesizing rate of the multi-valued image and the smoothed reduced image which was further converted by the foregoing processing. In this manner, it is possible to generate the synthesized image in a state with clearer distinction between the edge portion and the non-edge portion, so as to make the edge portion clearer and delete the noise portion more reliably.

Moreover, the reduced image obtained by reducing a multi-valued image is not restricted to a reduced image reduced at one reduction ratio, but reduced images reduced at a plurality of reduction ratios may be used. In this case, a plurality of reduction ratios may be previously stored into the storage device 23, or a plurality of reduction ratios may be previously stored and selection by the user may be accepted, for example, in a reduction ratio selection accepting device.

With the use of a plurality of reduced images, it is possible to execute the image synthesizing processing based upon determination according to each reduction ratio, using a reduced image with a large reduction ratio (the reduction ratio of 1/6 rather than the reduction ratio of 1/2, etc.) for a large-sized noise portion, and using a reduced image with a small reduction ratio (the reduction ratio of 1/2 rather than the reduction ratio of 1/6, etc.) for a small-sized noise portion, so that noise portions of a variety of sizes according to reduction ratios can be deleted while the edge portion is held.

It is to be noted that execution of the image synthesizing processing is not necessarily restricted to execution of sequential synthesizing processing as in the recurrence formula (8), but the synthesizing processing may be executed such that every image (Rslt[−1], Smth[0], Smth[1], . . . , Smth[n]) for use in the synthesizing processing is previously generated and a synthesizing rate with respect to each image is also previously calculated in block, to execute the image synthesizing processing at once.

Further, the reduction ratio may increase at a fixed ratio, or may increase at random. Moreover, the reduction ratio of 1/1 is not necessarily included. In any case, synthesized images are generated sequentially from the reduced image with the smallest reduction ratio.

As thus described, from the reduced image with the smallest reduction ratio, a synthesizing rate of a reduced image with a next large reduction ratio is calculated, to synthesize an image. Synthesizing rates are sequentially calculated and the image synthesizing processing is repeated, thereby to execute the image synthesizing processing based upon determination in accordance with the respective reduction ratios, so that noise portions of a variety of sizes in accordance with reduction ratios can be deleted while the edge portion is held.

As thus described, according to the third embodiment, performing the smoothing processing on the reduced image makes a local noise portion difficult to pickup, thereby enabling distinction between a portion likely to be the edge portion and a portion less likely to be the edge portion in accordance with the edge angle information. Therefore, the synthesizing rate is calculated such that a portion with higher dispersion of the luminance values, namely a portion more likely to be the noise portion, has a higher synthesizing rate of the smoothed image, whereby the noise portion can be reliably deleted while the edge portion is clearly held.

It is to be noted that, as in the first and second embodiments, two parameters "Offset" and "Gain" in the formula (6) may be previously stored into the storage device 23, or appropriate values thereof may be inputted by the user. The user interface is also the same as in the first and second embodiments, and the detailed description thereof is thus not given.

Further, the characteristic amount as the basis of calculation of the synthesizing rate of the multi-valued image and the smoothed reduced image (multi-valued image) is not restricted to the degree of variation in edge angle, the edge strength and the dispersion of the luminance values shown in the foregoing first to third embodiments, and is not restricted so long as being a characteristic amount that enables distinction between the edge portion and the non-edge portion.

What is claimed is:

1. An image generating apparatus for generating a smoothing-processed image from a multi-valued image picked up by an image pickup device, the apparatus comprising:
    an image reducing device for generating a reduced image by reducing the multi-valued image picked up by the image pickup device;
    a smoothing device for executing smoothing processing on the reduced image;
    an edge image generating device for generating an edge image based upon the reduced image;
    an edge angle information generating device for generating edge angle information concerning edge angles in pixel units from the generated edge image;
    a rate calculating device for calculating a synthesizing rate of the multi-valued image and the smoothed reduced image in pixel units of the reduced image based upon the generated edge angle information;
    an image enlarging device for generating an enlarged image by enlarging the smoothed reduced image to an identical scale as the multi-valued image;
    a rate converting device for converting the synthesizing rate calculated in pixel units of the reduced image into a synthesizing rate in pixel units of the enlarged image; and
    an image synthesizing device for synthesizing the multi-valued image and the enlarged image based upon the converted synthesizing rate.

2. The image generating apparatus according to claim 1, wherein the rate calculating device is configured to calculate a degree of variation in edge angle based upon the generated edge angle information, and calculate a synthesizing rate of the multi-valued image and the smoothed reduced image in pixel units of the reduced image based upon the calculated degree of variation in edge angle.

3. The image generating apparatus according to claim 2, comprising
    an edge strength information generating device for generating edge strength information concerning edge strengths in pixel units from the generated edge image,
    wherein the edge angle information generating device is configured to calculate a degree of variation in edge angle in pixel units based upon the generated edge strength information, to generate the edge angle information.

4. An image generating apparatus for generating a smoothing-processed image from a multi-valued image picked up by an image pickup device, the apparatus comprising:
    an image reducing device for generating a reduced image by reducing the multi-valued image picked up by the image pickup device;
    a smoothing device for executing smoothing processing on the reduced image;
    an edge image generating device for generating an edge image based upon the reduced image;
    an edge strength information generating device for generating edge strength information concerning edge strengths in pixel units from the generated edge image;
    a rate calculating device for calculating a synthesizing rate of the multi-valued image and the smoothed reduced image in pixel units of the reduced image based upon the generated edge strength information;
    an image enlarging device for generating an enlarged image by enlarging the smoothed reduced image to an identical scale as the multi-valued image;
    a rate converting device for converting the synthesizing rate calculated in pixel units of the reduced image into a synthesizing rate in pixel units of the enlarged image; and
    an image synthesizing device for synthesizing the multi-valued image and the enlarged image based upon the converted synthesizing rate.

5. The image generating apparatus according to claim 4, wherein the edge strength information generating device is configured to generate edge strength information in accordance with a degree of fluctuation in luminance value in the edge image.

6. An image generating apparatus for generating a smoothing-processed image from a multi-valued image picked up by an image pickup device, the apparatus comprising:
    an image reducing device for generating a reduced image by reducing the multi-valued image picked up by the image pickup device;
    a smoothing device for executing smoothing processing on the reduced image;
    a dispersion calculating device for calculating dispersion of luminance values in a region formed of a prescribed pixel and pixels adjacent to the pixel;
    a rate calculating device for calculating a synthesizing rate of the multi-valued image and the smoothed reduced image in pixel units of the reduced image based upon the calculated dispersion;
    an image enlarging device for generating an enlarged image by enlarging the smoothed reduced image to an identical scale as the multi-valued image;
    a rate converting device for converting the synthesizing rate calculated in pixel units of the reduced image into a synthesizing rate in pixel units of the enlarged image; and
    an image synthesizing device for synthesizing the multi-valued image and the enlarged image based upon the converted synthesizing rate.

7. The image generating apparatus according to claim 1, wherein
    the smoothing device is configured to also execute the smoothing processing on the multi-valued image,
    the rate calculating device is configured to also calculate a synthesizing rate of the multi-valued image and the smoothed multi-valued image, and
    the image synthesizing device is configured to synthesize the multi-valued image and the smoothed multi-valued image, and thereafter additionally synthesize the enlarged image based upon the synthesizing rate of the converted multi-valued image and the smoothed reduced image.

8. The image generating apparatus according to claim 1, comprising
    a reduction ratio selection accepting device for accepting a selection of a reduction ratio in the image reducing device,
    wherein the image reducing device is configured to hierarchically generate reduced images in an increasing order of reduction ratios in accordance with sizes of the reduction ratios, the selection of which have been accepted.

9. The image generating apparatus according to claim 8, wherein
    the rate calculating device is configured to calculate synthesizing rates of the multi-valued image and a plurality of the smoothed reduced images in pixel units of the respective reduced images, and the rate converting device is configured to convert a plurality of the synthesizing rates calculated in pixel units of the respective reduced images into a synthesizing rate in pixel units of the enlarged image.

10. The image generating apparatus according to claim 8, wherein the rate calculating device is configured to sequentially calculate, in the increasing order of reduction ratios, each of synthesizing rates of a reduced image with a next large reduction ratio and a synthesized image based upon the reduced image, synthesized by the image synthesizing device on the identical scale as the multi-valued image, the rate converting device is configured to sequentially convert synthesizing rates calculated in pixel units of the respective reduced images into synthesizing rates in pixel units of the identical scale as the multi-valued image, and the image synthesizing device synthesizes the smoothed reduced image and the synthesized images based upon the calculated synthesizing rates in pixel units, sequentially from the reduced image with a smallest reduction ratio.

11. An image generating apparatus for generating a smoothing-processed image from a multi-valued image picked up by an image pickup device, the apparatus comprising:

an image reducing device for generating a reduced image by reducing the multi-valued image picked up by the image pickup device;

a smoothing device for executing smoothing processing on the reduced image;

a rate calculating device for calculating a synthesizing rate of the multi-valued image and the smoothed reduced image in pixel units of the reduced image based upon luminance information of the reduced image;

an image enlarging device for generating an enlarged image by enlarging the smoothed reduced image to an identical scale as the multi-valued image;

a rate converting device for converting the synthesizing rate calculated in pixel units of the reduced image into a synthesizing rate in pixel units of the enlarged image; and an image synthesizing device for synthesizing the multi-valued image and the enlarged image based upon the converted synthesizing rate.

12. An image generating method executed in an image generating apparatus for generating a smoothing-processed image from a multivalued image picked up by an image pickup device, wherein a reduced image is generated by reducing the multi-valued image picked up by the image pickup device, smoothing processing is executed on the reduced image, an edge image is generated based upon the reduced image, edge angle information concerning edge angles is generated in pixel units from the generated edge image, a synthesizing rate of the multi-valued image and the smoothed reduced image is calculated in pixel units of the reduced image based upon the generated edge angle information, an enlarged image is generated by enlarging the smoothed reduced image to an identical scale as the multi-valued image, the synthesizing rate calculated in pixel units of the reduced image is converted into a synthesizing rate in pixel units of the enlarged image, and the multi-valued image and the enlarged image are synthesized based upon the converted synthesizing rate.

13. The image generating method according to claim 12, wherein a degree of variation in edge angle is calculated based upon the generated edge angle information, and a synthesizing rate of the multi-valued image and the smoothed reduced image is calculated in pixel units of the reduced image based upon the calculated degree of variation in edge angle.

14. The image generating method according to claim 13, wherein edge strength information concerning edge strengths is generated in pixel units from the generated edge image, and a degree of variation in edge angle is calculated in pixel units based upon the generated edge strength information, to generate the edge angle information.

15. An image generating method executed in an image generating apparatus for generating a smoothing-processed image from a multi-valued image picked up by an image pickup device, wherein a reduced image is generated by reducing the multi-valued image picked up by the image pickup device, smoothing processing is executed on the reduced image, an edge image is generated based upon the reduced image, edge strength information concerning edge strengths is generated in pixel units from the generated edge image, a synthesizing rate of the multi-valued image and the smoothed reduced image is calculated in pixel units of the reduced image based upon the generated edge strength information, an enlarged image is generated by enlarging the smoothed reduced image to an identical scale as the multi-valued image, the synthesizing rate calculated in pixel units of the reduced image is converted into a synthesizing rate in pixel units of the enlarged image, and the multi-valued image and the enlarged image are synthesized based upon the converted synthesizing rate.

16. The image generating method according to claim 15, wherein edge strength information is generated in accordance with a degree of fluctuation in luminance value in the edge image.

17. An image generating method executed in an image generating apparatus for generating a smoothing-processed image from a multi-valued image picked up by an image pickup device, wherein a reduced image is generated by reducing the multi-valued image picked up by the image pickup device, smoothing processing is executed on the reduced image, dispersion of luminance values in a region formed of a prescribed pixel and pixels adjacent to the pixel is calculated, a synthesizing rate of the multi-valued image and the smoothed reduced image is calculated in pixel units of the reduced image based upon the calculated dispersion, an enlarged image is generated by enlarging the smoothed reduced image to an identical scale as the multi-valued image, the synthesizing rate calculated in pixel units of the reduced image is converted into a synthesizing rate in pixel units of the enlarged image, and the multi-valued image and the enlarged image are synthesized based upon the converted synthesizing rate.

18. The image generating method according to claim 12, wherein
- the smoothing processing is also executed on the multi-valued image,
- a synthesizing rate of the multi-valued image and the smoothed multi-valued image is calculated in pixel units, and
- after the multi-valued image and the smoothed multi-valued image are synthesized, the enlarged image is also synthesized based upon the synthesizing rate of the converted multi-valued image and the smoothed reduced image.

19. The image generating method according to claim 12, wherein
- a selection of a reduction ratio is accepted, and
- reduced images are hierarchically generated in an increasing order of reduction ratios in accordance with sizes of the reduction ratios, the selection of which have been accepted.

20. The image generating method according to claim 19, wherein
- synthesizing rates of the multi-valued image and a plurality of the smoothed reduced images are calculated in pixel units of the respective reduced images, and
- a plurality of the synthesizing rates calculated in pixel units of the respective reduced images are converted into a synthesizing rate in pixel units of the enlarged image.

21. The image generating method according to claim 19, wherein
- in the increasing order of reduction ratios, each of synthesizing rates of a reduced image with a next large reduction ratio and a synthesized image based upon the reduced image, synthesized on the identical scale as the multi-valued image, is sequentially calculated,
- synthesizing rates calculated in pixel units of the respective reduced images are sequentially converted into synthesizing rates in pixel units of the identical scale as the multi-valued image, and
- the smoothed reduced image and the synthesized images are synthesized based upon the calculated synthesizing rates in pixel units, sequentially from the reduced image with a smallest reduction ratio.

22. An image generating method executed in an image generating apparatus for generating a smoothing-processed image from a multi-valued image picked up by an image pickup device, wherein
- a reduced image is generated by reducing the multi-valued image picked up by the image pickup device,
- smoothing processing is executed on the reduced image,
- a synthesizing rate of the multi-valued image and the smoothed reduced image is calculated in pixel units of the reduced image based upon luminance information of the reduced image,
- an enlarged image is generated by enlarging the smoothed reduced image to an identical scale as the multi-valued image,
- the synthesizing rate calculated in pixel units of the reduced image is converted into a synthesizing rate in pixel units of the enlarged image, and
- the multi-valued image and the enlarged image are synthesized based upon the converted synthesizing rate.

23. An image generating apparatus for generating a smoothing-processed image from a multi-valued image picked up by an image pickup device, the apparatus comprising:
- an image reducing device for generating a reduced image by reducing the multi-valued image picked up by the image pickup device;
- a smoothing device for executing smoothing processing on the reduced image;
- a rate calculating device for calculating a synthesizing rate of the multi-valued image and the smoothed reduced image in pixel units of the reduced image based upon a prescribed characteristic amount in the reduced image;
- an image enlarging device for generating an enlarged image by enlarging the smoothed reduced image to an identical scale as the multi-valued image;
- a rate converting device for converting the synthesizing rate calculated in pixel units of the reduced image into a synthesizing rate in pixel units of the enlarged image; and
- an image synthesizing device for synthesizing the multi-valued image and the enlarged image based upon the converted synthesizing rate.

24. An image generating method executed in an image generating apparatus for generating a smoothing-processed image from a multi-valued image picked up by an image pickup device, wherein
- a reduced image is generated by reducing the multi-valued image picked up by the image pickup device,
- smoothing processing is executed on the reduced image,
- a synthesizing rate of the multi-valued image and the smoothed reduced image is calculated in pixel units of the reduced image based upon a prescribed characteristic amount in the reduced image,
- an enlarged image is generated by enlarging the smoothed reduced image to an identical scale as the multi-valued image,
- the synthesizing rate calculated in pixel units of the reduced image is converted into a synthesizing rate in pixel units of the enlarged image, and
- the multi-valued image and the enlarged image are synthesized based upon the converted synthesizing rate.

* * * * *